US009450802B2

(12) United States Patent
Bishop et al.

(10) Patent No.: US 9,450,802 B2
(45) Date of Patent: Sep. 20, 2016

(54) STOP CONDITION FUNCTIONALITY IN A STATELESS MICROKERNEL WEB SERVER ARCHITECTURE

(71) Applicant: Elastic Path Software, Inc., Vancouver (CA)

(72) Inventors: Matthew D. Bishop, North Vancouver (CA); Jeremy Halford Skelton, Vancouver (CA); Ashley Doyle Thomas, North Vancouver (CA)

(73) Assignee: Elastic Path Software, Inc., Vancouver (CA)

( * ) Notice: Subject to any disclaimer, the term of this patent is extended or adjusted under 35 U.S.C. 154(b) by 855 days.

(21) Appl. No.: 13/734,143

(22) Filed: Jan. 4, 2013

(65) Prior Publication Data
US 2013/0179498 A1 Jul. 11, 2013

Related U.S. Application Data

(63) Continuation of application No. 13/646,052, filed on Oct. 5, 2012, and a continuation of application No. 13/633,008, filed on Oct. 1, 2012.

(60) Provisional application No. 61/584,037, filed on Jan. 6, 2012.

(51) Int. Cl.
*H04L 29/06* (2006.01)
*H04L 29/08* (2006.01)

(52) U.S. Cl.
CPC ......... *H04L 29/08072* (2013.01); *H04L 29/06* (2013.01); *H04L 67/02* (2013.01); *H04L 67/142* (2013.01); *H04L 67/42* (2013.01)

(58) Field of Classification Search
CPC ....... G06Q 30/00; G06Q 20/00; G06Q 90/00
See application file for complete search history.

(56) References Cited

U.S. PATENT DOCUMENTS 6,826,594 B1 * 11/2004 Pettersen .......... G06F 17/30893
705/59
8,645,217 B2 * 2/2014 Siegel ................ G06Q 30/0603
705/26.1

(Continued)

OTHER PUBLICATIONS

Fielding, R., "Architectural Styles and the Design of Network-based Software Architectures; Chapter 5; Representational State Transfer (REST)," http://www.ics.uci.edu/~fielding/pubs/dissertation/rest_arch_style.htm, Doctoral dissertation, University of California, Irvine, 2000, 17 pages.

(Continued)

*Primary Examiner* — Kamal Divecha
*Assistant Examiner* — Charles Murphy
(74) *Attorney, Agent, or Firm* — Alleman Hall McCoy Russell & Tuttle LLP

(57) ABSTRACT

A method of serving a resource from an HTTP server system having a stateless microkernel architecture and one or more link resource servers is provided. The method may include generating a data object in response to an HTTP request, sending the data object to each of the link resource servers, and at each link resource server receiving the data object from the handler and examining the data object for predetermined information to perform a linking operation. The method may further include if the data object includes the pre-determined information, performing the linking operation by returning one or more links to the handler linking to related information provided by the link resource server. The method may further include if the data object does not include the pre-determined information, not performing the linking operation and instead returning one or more stop condition links indicating that the pre-determined information is not included.

22 Claims, 9 Drawing Sheets

(56) References Cited

U.S. PATENT DOCUMENTS

| | | | |
|---|---|---|---|
| 2002/0077929 A1* | 6/2002 | Knorr | G06Q 10/087 705/26.81 |
| 2008/0215755 A1 | 9/2008 | Farber et al. | |
| 2009/0198820 A1* | 8/2009 | Golla | H04L 29/12594 709/228 |
| 2009/0300138 A1* | 12/2009 | Schneider | G06F 9/5055 709/217 |
| 2013/0030916 A1* | 1/2013 | Skalet | G06Q 30/018 705/14.58 |

OTHER PUBLICATIONS

"Hateoas," Wikipedia Foundation, Inc., http://en.wikipedia.org/wiki/HATEOAS, Updated Apr. 12, 2012, 2 pages.

"Microkernel," Wikipedia Foundation, Inc., http://en.wikipedia.org/w/index.php?title=Microkernel&oldid=513118058, Updated Sep. 17, 2012, 10 pages.

Bishop, Matthew D., "Linking Functionality for Encodeing Application State in Linked Resources in a Stateless Microkernel Web Server Architecture," U.S. Appl. No. 13/646,052, 42 pages.

Bishop, Matthew D., "Follow Location Handler and Selector Functionality in a Stateless Microkernel Web Server Architecture," U.S. Appl. No. 13/633,008, 56 pages.

Bishop, Matthew D., "Stateless Microkernel Web Server Architecture with Self Discoverable Objects," U.S. Appl. No. 13/734,096, 82 pages.

ISA Canada, International Search Report of PCT/CA2013/050002, Mar. 14, 2013, WIPO, 11 pages.

European Patent Office, Partial Supplementary European Search Report of EP13733889.3, Germany, Feb. 5, 2015, 5 pages.

Liskin, Olga et al.,"Teaching Old Services New Tricks: Adding HATEOAS Support as an Afterthought", Proceedings of the Second International Workshop on RESTful Design, Hyderabad, India, Mar. 28, 2011, 8 pages.

* cited by examiner

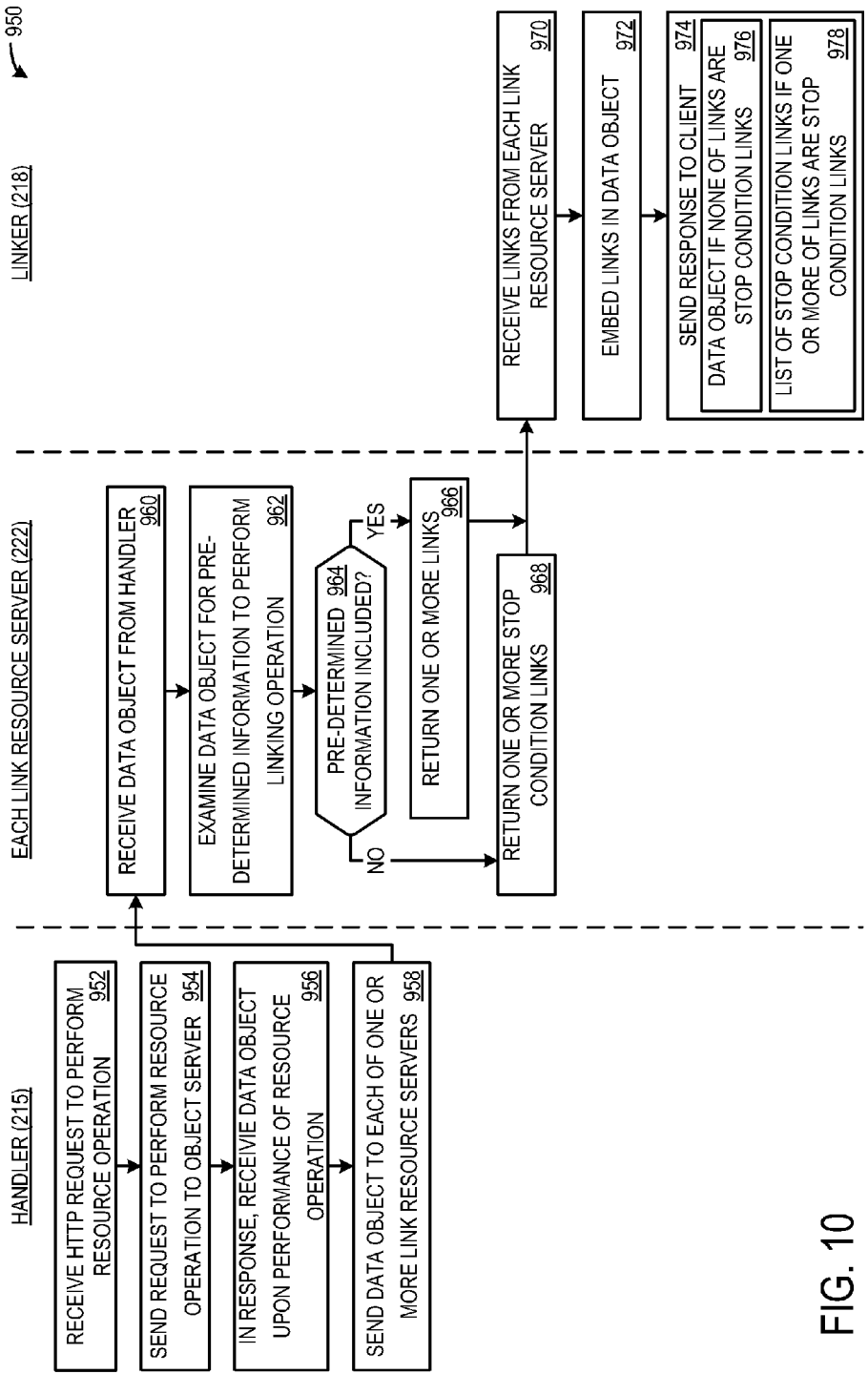

STOP CONDITION FUNCTIONALITY IN A STATELESS MICROKERNEL WEB SERVER ARCHITECTURE

CROSS REFERENCE TO RELATED APPLICATIONS

This application is a continuation of U.S. patent application Ser. No. 13/646,052, filed Oct. 5, 2012 and entitled LINKING FUNCTIONALITY FOR ENCODING APPLICATION STATE IN LINKED RESOURCES IN A STATELESS MICROKERNEL WEB SERVER ARCHITECTURE, which claims priority to U.S. Provisional Patent Application Ser. No. 61/584,037, filed Jan. 6, 2012 and entitled ENCODING APPLICATION STATE IN LINKED RESOURCES IN A STATELESS MICROKERNEL WEB SERVER ARCHITECTURE; the present application is also a continuation of U.S. patent application Ser. No. 13/633,008, filed Oct. 1, 2012 and entitled FOLLOW LOCATION HANDLER AND SELECTOR FUNCTIONALITY IN A STATELESS MICROKERNEL WEB SERVER ARCHITECTURE, which claims priority to U.S. Provisional Patent Application Ser. No. 61/584,037, filed Jan. 6, 2012 and entitled ENCODING APPLICATION STATE IN LINKED RESOURCES IN A STATELESS MICROKERNEL WEB SERVER ARCHITECTURE, the entirety of each of which is hereby incorporated herein by reference for all intents and purposes.

BACKGROUND

Representing the state of user sessions of client-server interactions is a challenging task, and conventional client-server systems represent state using a variety of software architectures. For example, some systems may save session state in a cookie on the client, while other systems may save the state in a data file on the server or utilize server sessions to track state. Yet other systems may communicate state through the networked resources themselves.

One example of the latter approach is the HATEOAS (Hypermedia as the Engine of Application State) REST (Representational State Transfer) style of software architecture. The REST architecture is a style of software architecture utilized by distributed hypermedia systems, such as the World Wide Web (WWW), that attempts to represent application state over a computer network via linked hypermedia. Software systems that comply with the principles of REST architecture are client-server based, stateless, layered, cacheable, optionally utilize on-demand code, and maintain a unified interface between the clients and servers.

HATEOAS is a constraint of the REST architecture that specifies all interaction between client(s) and server(s) is accomplished through hypermedia dynamically provided by the server(s). In principle, interactions utilizing such an approach may not require an intermediary session state (i.e., state may be completely represented in the hypermedia itself). A typical HATEOAS system is composed of discrete resources (objects), each of which has a consistent address (e.g., Uniform Resource Location "URL") that can be accessed by a requesting client over a computer network, such as the Internet. Each individual resource also has a consistent representation, which is indicated by a MIME (Multipurpose Internet Mail Extensions) type defined via the HTTP 'Content-Type' header for the resource. The representations can be encoded and transmitted between the server and client in any suitable format, such as JSON and XML, for example.

Resources of a typical HATEOAS system are inter-related via relationships that are defined exclusively by links embedded in the data object which is a representation of each resource. In other words, as a HATEOS system is "stateless" in principle, the state of the system is contained in the resources themselves and the links between resources. Each link includes a "REL" field defining the name of the relationship to the other resource and a "HREF" field defining the address (e.g., URL) to the other resource. During client-server interactions, a HATEOAS system provides four actions on resources: GET, POST, PUT, and DELETE.

In practice, the REST HATEOAS architectural style has numerous deficiencies, which the present invention has been conceived to address. For example, in the REST HATEOAS architecture, additional information is included within the HTTP header, thus tying a typical HATEOAS system to the HTTP protocol itself. Such a configuration may therefore render the typical system unusable with protocols other than HTTP. To address this deficiency, the embodiments disclosed herein remove the HTTP protocol and provide the semantics in a more neutral manner, thereby allowing for client-server interaction across a variety of protocols, if desired. Nonetheless, the HTTP protocol may be one of the protocols, among others, used to engage a system in accordance with embodiments of the present disclosure.

A second deficiency of the REST HATEOAS architecture arises once the objects are separated from their HTTP receiver endpoint. Specifically, the objects lose the content type and URL identity, and therefore this information must be provided via other mechanism(s). Thus, the disclosed embodiments embed this information in a data structure, referred to as the "self entity," of the object itself.

A third deficiency of the REST HATEOAS architecture is that the 'Content-Type' headers must transmit two distinct pieces of information: the type of the object and the encoding method. In typical systems, these two pieces of information may be concatenated with a "+" symbol within the HTTP header string. However, this practice obfuscates both pieces of information, and potentially makes processing of incoming requests from clients difficult and/or error-prone. Accordingly, the disclosed embodiments move the MIME type of the object into the above-mentioned self entity, and preserve the 'Content-Type' HTTP header for the purpose of expressing the object encoding method, such as JSON, XML, etc.

A fourth deficiency of the REST HATEOAS architecture is that a URL of a resource is a poor identifier in a complex, highly scaled web server implementation. For example, once a client accesses the system on one server, all the links in the representations are typically configured to point to the same server instance, thus "sticking" that client to that server instance. Thus, in practice, a scaled deployment utilizing a pool of servers must rely on a single entry point, such as a server load balancer, that routes request(s) from requesting client(s) to a particular server within the pool of servers. The servers in the pool must know the name of this entry point and construct their URLs to point to this entry point explicitly. Furthermore, the object itself is highly inflexible and breakable as its URL points to a hard server entry point. For example, as the pool of available servers decreases as one or more severs become unavailable, URL reference(s) to the unavailable server(s) are lost. As another example, as the pool of available servers increases, the clients that are stuck to particular server instances may not be able to utilize the additional computing resources, thereby leading to unbalanced server loading.

More importantly, by combining the server location and the URI of the resource together to form the URL, a typical system breaks a central REST tenet, namely, statelessness. The disclosed embodiments address these issues by separating the identity of the object from the server that provided the object. This identity, referred to as the URI, is stored in the above-described "self" entity and can be used to address the same logical resource on one or more other server instances.

As a fifth deficiency, the REST HATEOAS architecture has no concept of the user performing operations, and instead assumes completely anonymous interactions. Such a configuration is woefully impractical in most modern systems (e.g., e-commerce systems) where user authorization and/or authentication are required to consume resources and execute transactions. The disclosed embodiments address this issue by introducing the concept of a "resource operation," (e.g., action to be performed on a resource) and defining an "authorization server" to determine whether a requesting user is authorized to perform a given resource operation. Accordingly, all resource operations must provide a user identifier indicating the identity of the requesting user. The identity of the user may be an anonymous identifier, a user role identifier, or other identifier which does indicate personally identifiable information. Such a configuration may therefore allow the user to access resources that are dedicated exclusively to the user and/or to access resources that are dedicated to a particular "role" shared by the user and one or more other users.

SUMMARY

To address the above issues, a method of serving a resource to a client via a computer network with an HTTP server system having a stateless microkernel architecture and one or more link resource servers is provided. The method may include, at a handler executed by a server of the HTTP server system, receiving an HTTP request from an HTTP client via the computer network to perform a resource operation on a resource, which is a data object. The method may further include sending a request to perform the resource operation to an object server associated with the resource, and in response, receiving the data object from the object server upon performance of the resource operation by the object server. The method may further include sending the data object to each of the one or more link resource servers. The method may further include at each link resource server of the one or more link resource servers executed by the server, receiving the data object from the handler, and examining the data object for pre-determined information to perform a linking operation. The method may further include if the data object includes the pre-determined information, performing the linking operation by returning one or more links to the handler linking to related information provided by the link resource server. The method may further include if the data object does not include the pre-determined information, not performing the linking operation and instead returning one or more stop condition links indicating that the pre-determined information is not included. The method may further include at a linking engine executed by the server receiving the links from each link resource server, embedding the links in the data object, and sending a response to the HTTP client via the computer network. The response may comprise the data object if none of the links are stop condition links, and the response may comprise a list of stop condition links if one or more of the links are stop condition links.

BRIEF DESCRIPTION OF THE DRAWINGS

FIG. 10 shows a flowchart illustrating a method of serving a resource to a client via a computer network in accordance with another embodiment of the present disclosure, which features stop condition functionality.

DETAILED DESCRIPTION

Figure 1:
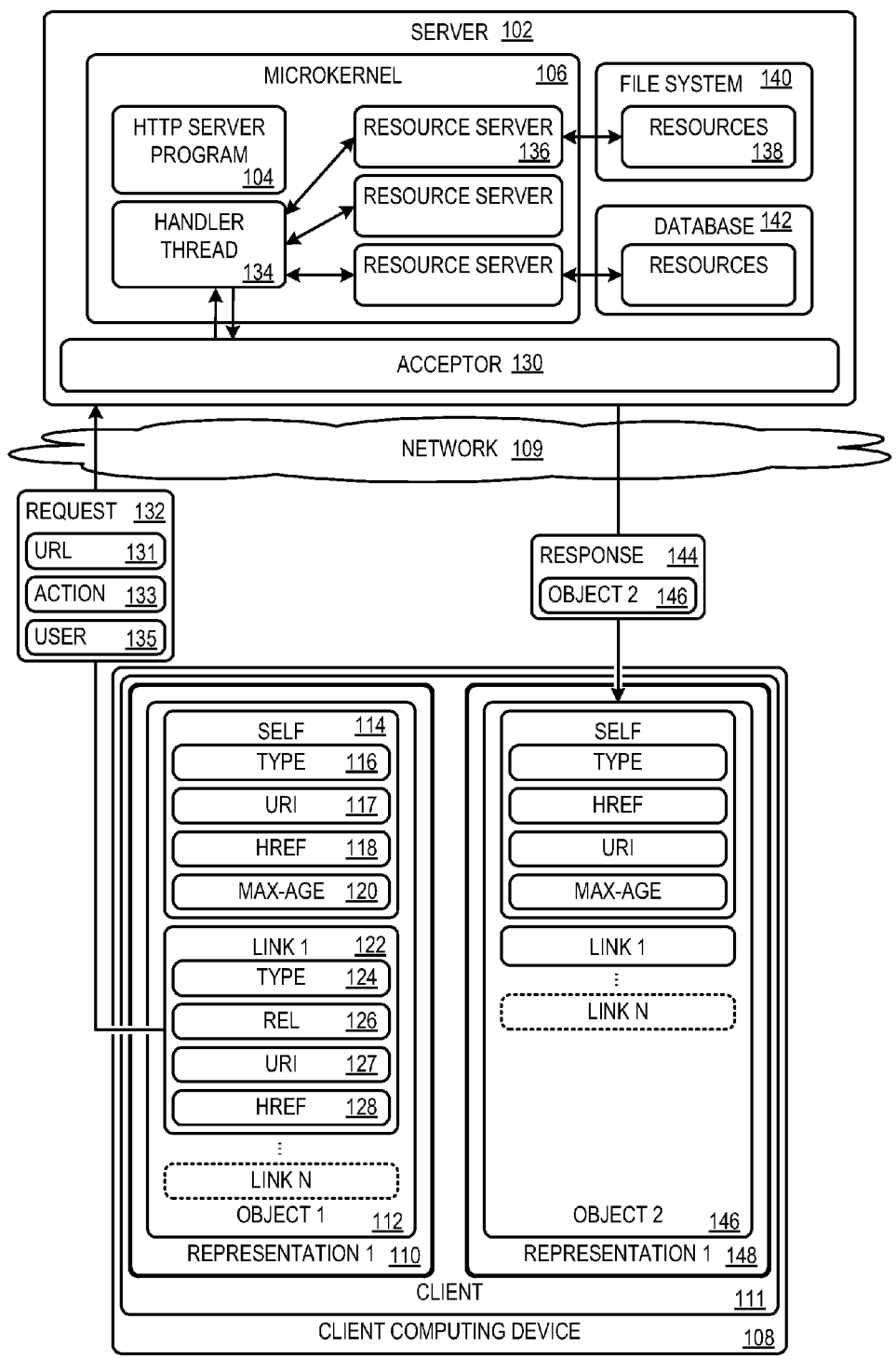
FIG. 1 shows a non-limiting example of a resource in accordance with an embodiment of the present disclosure.

From the preceding discussion, it will be appreciated that HATEOAS is a constraint of the REST architecture that specifies all interaction between client(s) and server(s) is accomplished through hypermedia dynamically provided by the servers. REST systems are "stateless" in that each request from a client to a server contains all information necessary to interpret the request. This approach allows for a particular server to handle a request from a client regardless of whether or not that server has handled previous requests from that client.

In order to meet said constraints, each resource in a HATEOAS system is a network-addressable object accessible via a consistent Uniform Resource Locator (URL), and HATEOAS systems operate on these objects. In other words, the term "resource," as used herein, refers to a network addressable data object (hereinafter "object") that encompasses some meaningful concept. Each object includes all information necessary to understand how to interact with the corresponding resource, such as how to provide a "representation" of the resource (e.g., how to visually present the object to a user via a display device) and how to link to/from the resource. Before continuing, it will be understood that an object may "represent" a resource in that the object provides the current state of the resource, and the object may be usable by each requesting client to provide a "representation" of the object that may be dependent upon one or more characteristics of the client. In other words, as will be described in greater detail below, the same object may be usable to provide different "representations" on different clients. Put another way, a resource may be thought of as a software implementation of business logic, an object may be thought of as an encoding of that business logic, and a representation may be thought of as a manifestation of an object at the client device.

As one non-limiting example, an electronic commerce system utilizing the HATEOAS architecture may comprise a "shipping" resource to maintain shipping information, and thus to respond to requests (e.g., resource operations) for the shipping information (e.g., user account shipping information, available shipping methods, etc.). Similarly, the example e-commerce system may further comprise an "inventory" resource to maintain inventory information, a "price" resource to maintain pricing information, and a "cart" resource to maintain an online shopping cart. From this example, it will therefore be appreciated that the information provided by each resource may be related to (e.g., depend on, depend from, etc.) any one or more other resources.

A given resource may be related to one or more other resources defined by links within the object representing the resource. As one simple example, a saleable good resource may link to a current availability resource indicating the availability of a particular saleable good. As will be described in greater detail below, a HATEOAS system according to embodiments of the present disclosure provides a corresponding resource server for one or more resources, where each resource server is configured to maintain the resource and/or respond to external requests for the resource (e.g., provide links).

Continuing with the above example, the link to the cart link may subsequently be acted upon (e.g., upon actuation of a displayed "add to cart" button) in order to add the saleable good to the online shopping cart and/or to otherwise interact with the online shopping cart. In this way, state transitions are defined via the links, and one or more of the links may be acted upon in order to effect one or more of the transitions. Such a configuration therefore satisfies the central pillar of the REST architecture that all possible next-state transitions be defined within an object provided to the client.

In complex systems, e.g., e-commerce systems, factory floor systems, etc., such linking may be unduly burdensome due to the myriad of interconnected and interdependent rules, e.g. business rules, error handling, etc., which are inherent to such systems. This potential shortcoming has restrained widespread adoption of the HATEOAS architecture for typical complex systems. For example, in an e-commerce system, once a particular saleable good is recognized as out of stock, such an event may effect removal of the saleable good from an online shopping cart, provision of a request to reorder the good, changes to a product page, an increase in price to one or more related goods, provision of backorder notifications for pending transactions, and/or one or more other dependent actions. Failure to effect one or more of these dependent actions may lead to an undefined system state and/or may provide an unsatisfactory user experience. For example, if the available inventory of a particular saleable good is depleted without updating one or more affected resources, users of an e-commerce system may place an order for the saleable good without being aware that the item is out of stock.

Accordingly, typical complex systems may utilize non-HATEOAS architectures. These systems may be "exception-driven" or "error-driven" such that branching (e.g., business logic) is implemented upon occurrence of an exception/error. For example, in some embodiments, upon occurrence of an "out of stock" error/exception (e.g., upon trying to checkout with an out-of-stock product), typical systems may have to, for example: determine whether the product should still be orderable (e.g., via backorder), remove the "add to cart" button, remove the page from search results, etc. Such error-handling may be hardcoded into the client software, potentially requiring frequent updates to the client software as business rules are updated. In other embodiments, the "out of stock" error may simply be returned to the user, and the user may thus be expected to manually handle the error accordingly (e.g., remove out of stock items from cart before ordering). However, such a configuration relies heavily on the user, and may therefore provide inaccurate results and/or may otherwise degrade the user experience. As described below, the disclosed embodiments enable a client without knowledge of a complete set of business rules to present all available options to a user in a representation of the object presented to the user, and effect appropriate state transitions upon selection of an option.

It will therefore be appreciated that it may be desirable to "cluster" each of the business rules, decision logic, etc. around a corresponding resource server. In other words, the business rule(s) related to the maintenance of the "current availability" resource (e.g., reordering, out of stock notifications, etc.) may be instantiated within the logic of the "current availability" resource server. Such a configuration may therefore provide, for each resource, a single repository where logic related to the resource may be maintained. Accordingly, update(s) to the business rules, to link(s) between the resources, and or to the visual representations of the resources may potentially be updated on the server without extensive modification the client software. Furthermore, by instantiating such logic within one or more servers, and thus removing the logic from the clients, the described HATEOAS architecture may potentially allow for lighter-weight client(s) as compared to typical systems.

It will be further appreciated that by clustering the logic for a given resource with the corresponding resource server, an improved schema for linking between objects may be realized. As will be discussed in detail below, requests to a HATEOAS server for a particular object may effect collecting of link(s) related to the object and subsequent attaching the link(s) to the object before returning the object to the requesting client. As each resource server is substantially independent (i.e., does not directly interact with a resource of another resource server), it may be possible for each resource server to be queried (e.g., for links associated with a particular object) in parallel and/or for such querying to be substantially order-agnostic. Accordingly, the disclosed embodiments may potentially provide a more resilient and extensible linking schema that is suitable for implementing complex systems. Although an e-commerce system is used herein as an example of a system usable with the described improved HATEOAS REST architecture, it will be appreciated that the architecture may be utilized by any stateful process and/or any data model comprising inter-related information without departing from the scope of the present disclosure.

Turning to FIG. 1, an example of an embodiment of a HATEOAS-based client-server system 100 including server 102 configured to execute a HTTP server program 104 via microkernel 106 is illustrated. System 100 further comprises client computing device 108 configured to communicate with server 102 via network 109. Client computing device 108 may provide client 111 (e.g., web browser) so as to facilitate such communication. Client 111 may be configured, for example, to provide representation 110 of a data object 112 (hereinafter "object"). As previously mentioned, the term "representation," as used herein, refers to a specific presentation (e.g., visual, audio, etc.) of an object. It will be understood that each object may be interpreted and presented according to various features, preferences, etc. of each client 111. In other words, a representation of object 112 other than representation 110 may be provided by client(s) other than client 111.

As described above, typical HATEOAS systems rely upon the HTTP protocol implementation to provide low-level functions. Specifically, the MIME-type (also referred to as 'Content-type') component of the HTTP header may be used to define both the representation of the resource and the encoding method. Including additional information within the HTTP header may restrict use of other communication protocol(s), and/or may otherwise negatively affect operation of the system. The typical HATEOAS architecture may therefore not be able to provide the features of an e-commerce system.

Accordingly, it may be desirable to develop an architecture that is protocol-independent, and as such, object 112 includes a "self" entity 114 (e.g., data structure) comprising a plurality of characterizing data that may have otherwise been included in the HTTP header in a typical HATEOAS system. The characterizing data may include, but is not limited to, type 116, Uniform Resource Identifier "URI" 117, HREF 118, and max-age 120.

Type 116 provides a name of a data schema and may be used to define one or more characterizing features of object 112. As one non-limiting example, type 116 of a movie object may be a schema such as "application/vnd.imdb.movie" informing client 111 that the object is a movie. The schema may further indicate to the client what additional field(s), if any, to expect within object 112. For example, the "application/vnd.imdb.movie" schema may be defined to have a field called "rating" that describes the rating of the movie. Thus, upon recognizing an object being of the above-described movie object type, the client may access the "rating" field to determine the rating, if desired. In some embodiments, the additional field(s) may be provided within self entity 114 and/or elsewhere within object 112. It will be understood that the schema does not define the kinds of links to expect, which will be discussed in greater detail below, but rather defines feature(s) of the object, such as the zero or more additional field(s) in the particular object.

URI 117 may identify the resource represented by the object, whereas HREF 118 may identify the location of the resource. In other words, HREF 118 may identify how to access the resource identified by URI 117. For example, HREF 118 may comprise a location of server 102, URI 117 of the particular resource, an action to perform on the resource, and/or a protocol to provide such interaction. As one non-limiting example, URI 117 of a cart-type object of an e-commerce system may be "/store/cart/123," whereas HREF may be "https://www.mystore.com/store/cart/123."

Max-age field 120 indicates a maximum age (e.g., in seconds) from creation/download of object 112 that client 111 may display, or otherwise provide, representation 110 of object 112. Once this maximum age is surpassed, client 111 may be configured to request an updated instance of object 112 from server 102 rather than display representation 110, which is over the aging limit. For example, if a particular object 112 includes max-age field 120 of 86,400 seconds (i.e., 24 hours), client 111 may use this information to cache the object locally so as to avoid further calls to the system (e.g., READ requests) for the object for 24 hours. As mentioned above, typical HATEOAS systems provide information via the HTTP header, and max-age field 120 may constitute at least some of that information. As not all HTTP clients may be able to manage this information in the HTTP headers, typical configurations may effect unnecessary network traffic and server load. Further, by placing field 120 inside object 112, each client 111 may manage its own caching of the object.

Object 112 further comprises zero or more links 122, illustrated as an arbitrary number N links, each defining a relationship between the object and a related resource. Each link 122 may comprise, for example, "TYPE" element 124 defining the type of object returned by the link, "REL" element 126 defining the name of the relationship between object 112 and the returned object, URI element 127 identifying the resource providing the returned object, and "HREF" element 128 defining the location of the linked resource.

One non-limiting example of object 112 is an online shopping cart, as follows. Self entity 114 of the example shopping cart object includes a content type 116 of "application/vnd.elasticpath.cart" and an additional object field called "total-quantity" defined by the content type that indicates how many items are in the cart. In other words, the schema identified via content 116 may alert the receiving client to expect a "total-quantity" field.

```
{
  self: {
    type: "application/vnd.elasticpath.cart",
    href: "http://10.10.30.66/shapi/carts/rockjam/3456",
    uri: "/carts/rockjam/3456"
    max-age: 0,
  },
  total-quantity: 10,
  links: [
    {
      type: "application/vnd.elasticpath.links",
      href: "http://10.10.30.66/shapi/carts/rockjam/3456/lineitems",
      uri: "/carts/rockjam/3456/lineitems",
      rel: "lineitems",
      rev: "cart"
    },
    {
      type: "application/vnd.elasticpath.order",
      href: "http://10.10.30.66/shapi/orders/rockjam/34453",
      uri: "/orders/rockjam/34453",
      rel: "order",
      rev: "cart"
    },
    {
      type: "application/vnd.elasticpath.total",
      href: "http://10.10.30.66/shapi/totals/carts/rockjam/3456",
      uri: "/totals/carts/rockjam/3456",
      rel: "total",
      rev: "cart"
    }
  ]
}
```

In combination with self entity 114, links 122 provide all the information necessary to implement a HATEOAS system, as described above. In other words, if object 112 is instructed (e.g., via user interaction, such as "clicking," with representation 110) to perform a state transition (e.g., follow link 122), object 112 includes all information needed to access the link (e.g., how to contact server 102 in order to follow the link) and/or to manipulate the representation itself.

For example, during operation, client 111 may send resource operation request 132 corresponding to a particular link 122 in object 112 downloaded to client computing device 108. The request is defined by HREF element 128 of the particular link 122, and may include, for example, URL 131 indicating a location of the linked resource and action 133 indicating an action (e.g., PUT, GET, POST, or DELETE) to perform on the linked resource. For example, upon following an "add to cart" link, request 132 may include a request to POST an "add to cart" request to the "shopping cart" resource. In some embodiments, the request may further comprise user identifier 135, which will be discussed in greater detail below. Such a request is provided for the purpose of example, and is not intended to be limiting in any manner.

Request 132 is sent to server 102 via computer network 109, and is received at server 102 by acceptor 130 associated with microkernel 106. Acceptor 130 performs processing of request 132, and dispatches the request to an appropriate handler thread 134 of microkernel 106 for further processing. The handler thread, in turn, calls various resource servers 136 associated with various resources 138 in order to retrieve the requested data. For example, as illustrated, resources 138 may be stored in file systems 140 and/or databases 142, or programmatically generated from data stored therein.

Based upon the processing of resource servers 136, response 144 including object 146 is generated, and is subsequently transmitted via network 109 to client computing device 108.

As with object 112, client 111 may be configured, upon receiving object 146, to provide representation 148 of object 146. Specifically, client 111 may be configured to examine type 116 and/or the "REL" element of each link included within object 146 in order to provide representation 148. For example, if client 111 identifies object 146 as a catalog entry (e.g., by examining type 116), and if an "add to cart" link is not present within the object, client 111 may be configured to provide a disabled (e.g., "grayed-out") add-to-cart button via representation 148. In other embodiments, client 111 may be configured to display no "add to cart" button. It will be understood that these scenarios are presented for the purpose of example, and are not intended to be limiting in any manner.

Interaction with representation 148 (e.g., via clicking) may effect transmission of a second resource operation request and subsequent receipt of a third object (not illustrated). It will be appreciated that such interaction may be repeated ad infinitum and/or until a desired state is reached.

Figure 2:
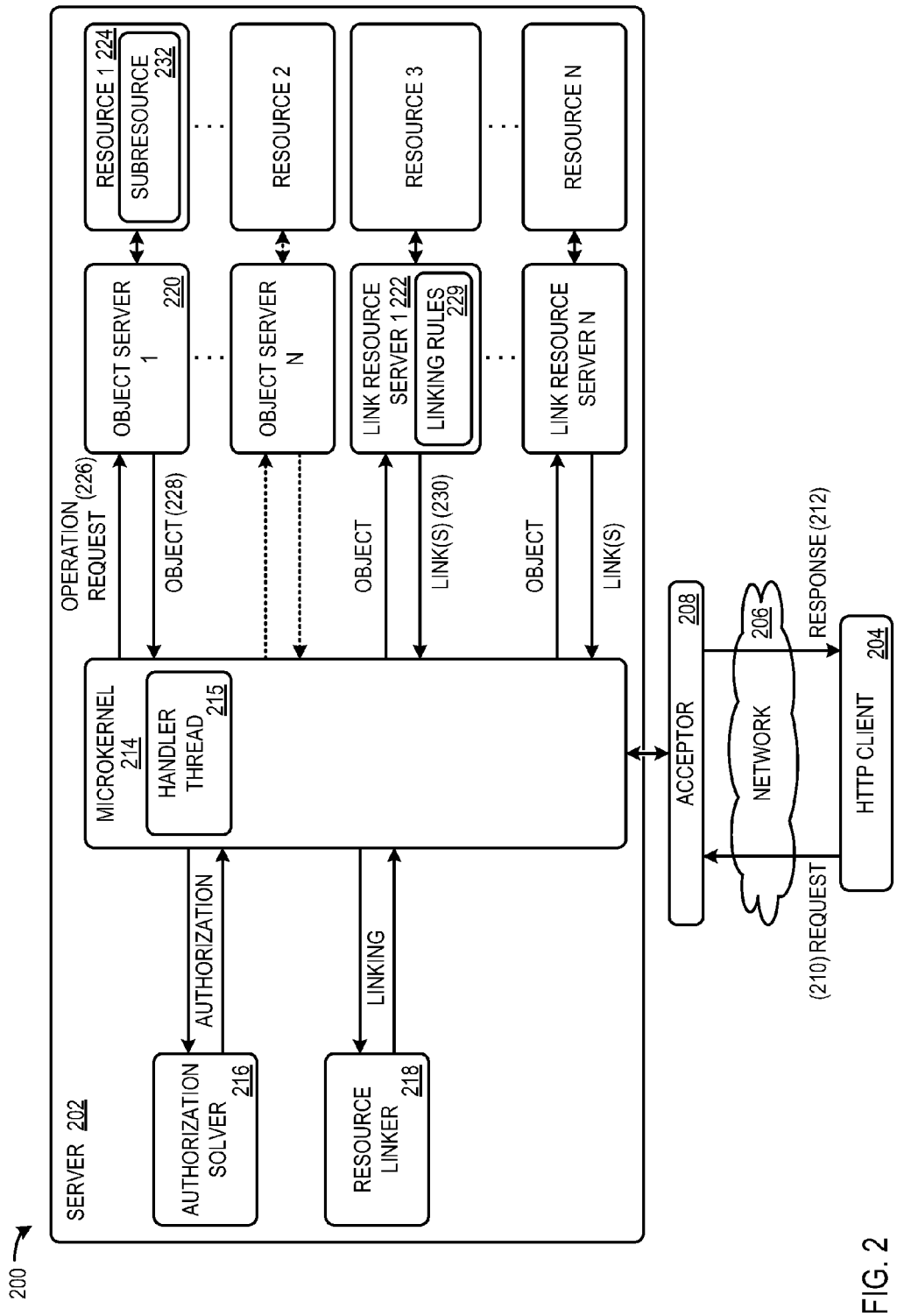
FIG. 2 shows a non-limiting example of a HATEOAS microkernel in accordance with an embodiment of the present disclosure.

Turning now to FIG. 2, a non-limiting example of a HATEOAS system 200 in accordance with another embodiment of the present disclosure is schematically illustrated. System 200 comprises server 202 communicatively coupled to HTTP client 204 via network 206. Server 202 is configured to receive, via acceptor 208, request 210 from client 204 and to send, via the acceptor, response 212. Server 202 includes kernel 214 configured to interact with the remaining elements of the server, thereby acting as the "central communications hub" of server 202. For example, kernel 214 may provide a handler thread 215 to handle the described request-response lifecycle. Server 202 yet further includes authorization solver 216 and resource linker 218. The resource linker may utilize the authorization solver to determine if a particular resource server is authorized to attach links, as is discussed in greater detail below.

Server 202 includes one or more object servers 220 and one or more link resource servers 222, each sometimes referred to as "resource servers." Although object servers 220 and link resource servers 222 are illustrated via an arbitrary number N of object servers and an arbitrary number N of link resource servers, respectively, it will be appreciated that such illustration is provided for ease of understanding, and that server 202 may include additional and/or different resource servers in other embodiments without departing from the scope of the present disclosure. It will be further appreciated that although object servers 220 and link resource servers 222 are illustrated as distinct components, any particular resource server may operate as an object server or a link resource server, depending on the particular request 210, as will be described in more detail below.

The object servers 220 and link resource servers 222 are distinct software programs configured to interact with each other by exchanging, i.e., sending and/or receiving, resource operations via kernel 214. Each resource server operates independently from the others and is the only resource server that serves data objects for its resource. In other words, no resource servers other than the resource server corresponding to a particular resource 224 are able to directly interact with or modify the resource. For example, in the depicted configuration, "Object Server 1" may not directly interact with resources 224 other than "Resource 1." Such a configuration may therefore enable the implementation of business rules and/or other logic associated with a particular resource 224 within the associated resource server. In this way, each object server 220 and/or link resource server 222 is responsible for a particular resource 224 (e.g., e-commerce platform, inventory management system, data management system, database, file system, etc). For example, in an e-commerce scenario, one of the resource servers may be a "price" resource server configured to provide requested price(s), and all pricing-related logic (e.g., bulk discounts, sales, other promotions, etc.) may be implemented by the "price" resource server and only the "price" resource server.

An example request-response lifecycle of system 200 is as follows. Request 210 comprises a request to retrieve (e.g., READ) a particular resource of resources 224. Upon receiving request 210 from client 204 via acceptor 208, kernel 214 is configured to provide the request to the resource server identified by the request. In some embodiments, kernel 214 may be configured to parse the URI identified by the request (e.g., URI derived by acceptor 208 from URL 131) to determine the corresponding resource server. In other embodiments, kernel 214 may be configured to determine the corresponding server via one or more other mechanism(s). As illustrated, kernel 214 provides resource operation request 226 to "Object Server 1," and microkernel 214 receives object 228 in response. Object 228 corresponds to the resource (i.e., "Resource 1") providing the object server, and represents the state of the resource after performance of the resource operation request.

Upon receiving object 228, microkernel 214 is configured to provide the object to resource linker 218 in order to aggregate, and to subsequently attach to the object, any one or more links 230 provided by the remaining resource servers (e.g., by link resource servers 222). In other words, the resource linker is configured to collect links with additional, related information from the other resource servers.

In an example e-commerce scenario, object 228 may represent a product entry in an online catalog. For example, request 210 may comprise a request for a product information "page" for a particular product, where the "page" includes a description, price, and indication of available inventory for the product. Thus, the example object 228 received from the appropriate object server 220 comprises a catalog entry object corresponding to the product. For example, object 228 may comprise a product identifier (e.g., product ID, product title, etc.) and/or additional information such that the remaining resource servers may provide information related to the product (e.g., description, pricing, etc.).

Accordingly, once object 228 is received at resource linker 218 via microkernel 214, the resource linker is configured to provide the object to the one or more link resource servers 222 in order to populate the catalog entry through receipt, and subsequent embedding, of links 230. For example, link resource servers 222 in this scenario may include a price resource server, an inventory resource server, a product description resource server, and a shipping resource server. Each of the resource servers, upon receiving object 228 from the resource linker, may examine the object, and respond with any relevant links 230. Thus, the object may be augmented with price data returned by the price resource server, inventory data returned by the inventory server, description data returned by the product description server, and shipping information returned by the shipping resource server. Generally speaking, each link resource server 222 may implement one or more linking rules 229 (e.g., business rules, other logic, etc.) to determine which link(s) to return for a given object 228. The result of such linking, as discussed above in reference to FIG. 1, is stored within the object, and is eventually returned to the requesting client.

Although the above description pertains to so-called monolithic resources servers (e.g., shipping resource server to provide shipping information), there may be one or more subresources 232 for each of any one or more resources 224 in some embodiments. Each subresource 232 may be utilized to provide additional information to a given resource 224. Accordingly, subresources 225 may be added, deleted, or modified without any update to the associated resource, thereby potentially further increasing the extensibility of system 200. The subresources, along with the rest of the resources, are queried during linking to determine if the subresources have related information. For example, returning to the above e-commerce scenario, although the shipping resource exists to provide shipping information (e.g., shipping method selection, pricing, estimated delivery, etc.), it is each subresource that may define the individual shipping options (e.g., 3-day), etc. Thus, if a new shipping option (e.g., overnight) becomes available, a new subresource 232 can be created to define said option without updating the parent "shipping" resource. In such scenarios, after the shipping resource has handled a "shipping" resource operation, the linker may query the subresources to determine additional details.

In order to provide information related to object 228, each link resource server 222 may be configured to examine the "type" element of object 228 (e.g., TYPE 116), as more than one object encountered by a particular resource server may comprise similar, or equivalent, names (e.g., REL 126). Each resource server may implement one or more functions, and each of these functions may be defined for any one or more object types. In other words, each resource server may be configured to perform type-granular resource operations on a corresponding resource of resources 224. For example, a "shopping cart" resource server may be configured to not provide an "add to cart" link to an object of "image" type, but may be configured to provide such a link to an object of "product" type. As another example, upon encountering an object type for which no corresponding logic exists (e.g., new object type) at a particular resource server, the resource server may be configured to provide no links 230. It will be understood that, depending on the particular use case scenario and/or configuration of server 202, links 230 may include "direct" information and/or "indirect" information (e.g., information usable to programmatically retrieve other information). For example, in some embodiments, the product description resource server may be configured to provide a text-based description of the product such that the information provided in the link(s) is directly usable to provide the product description. In other embodiments where the information is "indirect," the information provided by the product description resource server may be usable by client 204, upon receipt, to programmatically retrieve the product description (e.g., from the product description resource server).

In some instances, one or more of link resource servers 222 may not be able to provide links 230, and may instead perform, in response to the query, a "default action." In some instances, such a default action may include, for example, providing an error status (e.g., "Out of stock" notification), providing a link to an error status (e.g., link to error status with up-to-date information), and/or providing nothing (e.g., no response, response with no data payload, etc.). In other instances, a resource server may provide different and/or additional default actions without departing from the scope of the present disclosure.

Generally speaking, resource linker 218 is configured to collect any information related to object 228. Accordingly, resource linker 218 may be configured to provide object 228 to every resource server of server 202. Thus, the resource linker may be configured to maintain an understanding of all of the resource servers (e.g., via a resource server list, etc.) of server 202. As mentioned previously, each resource server may be substantially independent of the other resource server(s). Therefore, linker 218 may be configured to query the resource servers in any desired order, so long as each resource server is queried. For example, in some embodiments, linker 218 may query one or more of the resource servers in parallel to increase throughput.

Regardless of the order by which the resource servers are queried, the resource server is aware that linking is complete for a particular object once all resource servers have been queried. As object 228 is passed to each resource server, and as each resource server is configured to provide information, i.e., links, independent of the information provided by the other resource server(s), it will be appreciated that the links are not embedded within the object until all link(s) have been collected from all of the resource servers. Once all the links have been collected and embedded in the object, the object is returned to the requesting client.

Although operation of resource linker 218 has been described with reference to interactions between the linker and one or more resource servers, it will be appreciated that such interaction may be provided via kernel 214. As mentioned above, the resource servers are isolated modules configured to interact with each other by exchanging (e.g., sending and/or receiving) resource operations via kernel 214. Accordingly, in order to query a particular resource server, linker 218 may be configured to provide a query resource operation (e.g., READ operation) for the particular resource server to the kernel, and the kernel may subsequently provide the query to the corresponding resource server. Similarly, the link(s) provided by the resource server may be received by linker 218 via kernel 214.

As mentioned above, HATEOAS systems are, by design, typically unaware of the concept of "users," and may therefore be ill-suited for e-commerce scenarios and/or for other applications utilizing user-based permissions, preferences, etc. Accordingly, server system 200 further includes authorization solver 216 so as to provide kernel 214 with user authentication needed for the improved HATEOAS architecture. Specifically, after microkernel 214 receives a resource operation (e.g., resource operation request 226, linking operation requests, etc.), the kernel may be configured to communicate with the authorization solver to ensure that the given resource operation is allowed. In other embodiments, the kernel may forward a subset of the resource operation request data.

For example, in some embodiments, request 210 may further comprise a user identifier (e.g., user identifier 135) indicating the user providing the request. The user identifier may comprise any data, or combination of data, used to determine the permissions of a given user. For example, in some embodiments, the user identifier may be a substantially unique identity (e.g., user name). In other embodiments, the user identifier may define a role (e.g., administrator) with which permissions are associated, and the role may be shared amongst any one or more users. Generally speaking, request 210 may comprise at least some identifying information such that server system 202 may examine this information to determine whether or not the resource operation identified by the request is allowed to be performed.

Accordingly, upon receiving request 210, kernel 214 (e.g., handler 215 of kernel 214) may be configured to determine the user identifier, role identifier, and/or other identifying information, and may thus supply authorization solver 216 with this information. Authorization solver 216 may then be configured to examine the information, and to provide an indication (e.g., yes/no, detailed result, etc.) to kernel 214 as to whether or not the request should be handled. In other embodiments, kernel 214 may forward request 210 to authorization solver without first identifying a user, role, etc. It will be appreciated that these scenarios are presented for the purpose of example, and are not intended to be limiting in any manner. The interaction between the various elements of FIG. 2 will now be discussed in greater detail with reference to FIG. 3.

Figure 3:
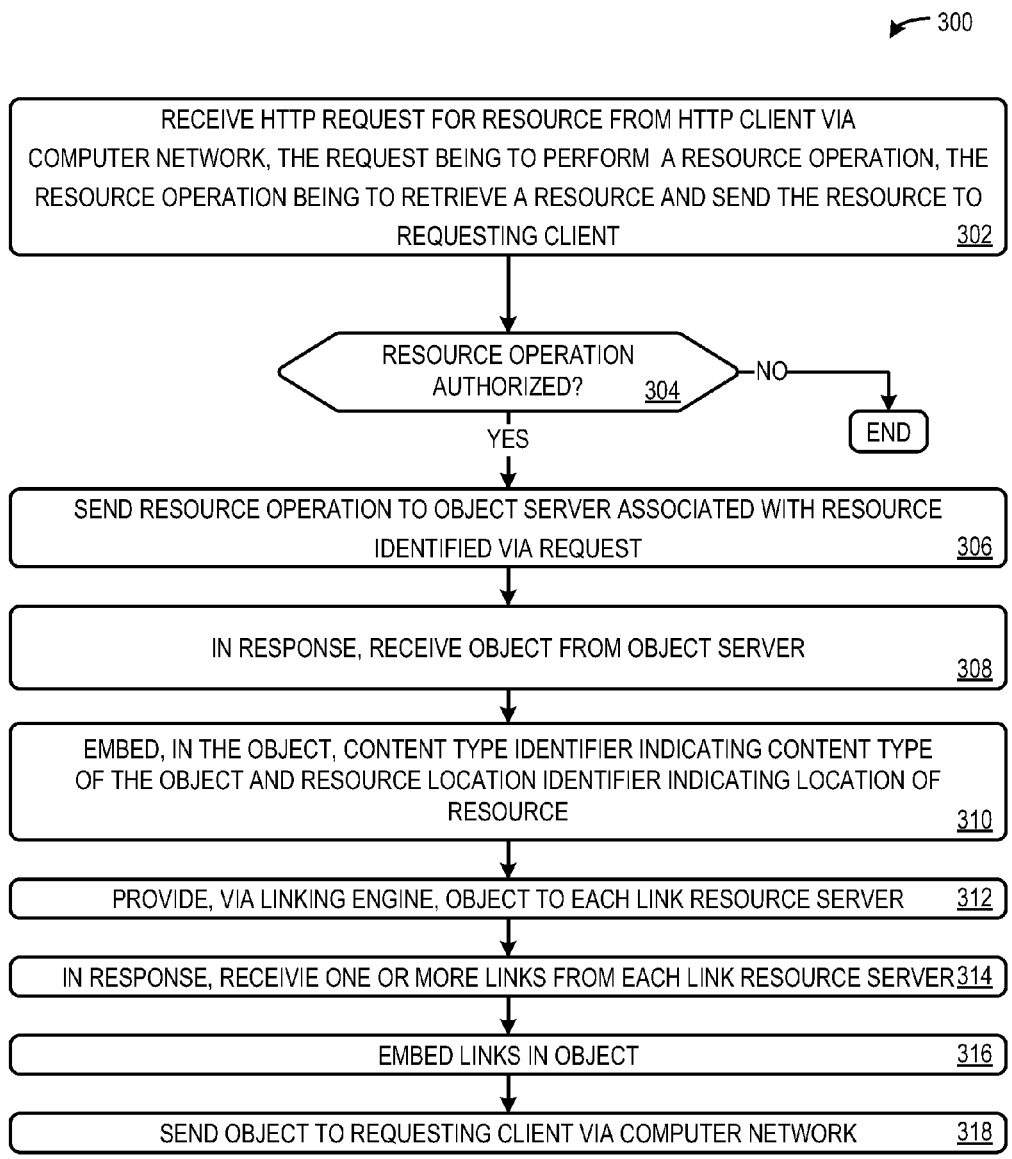
FIG. 3 is a flowchart illustrating a method of serving a resource to a client via a computer network in accordance with one embodiment of the present disclosure.

FIG. 3 illustrates a process flow depicting an embodiment of a method 300 for serving a resource to a client via a computer network at an HTTP server system (e.g., server 102, server 202, etc.) having a stateless microkernel architecture. At 302, method 300 comprises receiving an HTTP request (e.g., request 132) for a resource from an HTTP client via a computer network, where the request is to perform a resource operation. The resource operation may comprise, for example, a request to retrieve the resource (e.g., a READ operation) and send the resource to the requesting client. In order to effect the resource operation, the request may include, for example, a user identifier, a resource URI, and an action to perform on the resource identified by the URI. Although method 300 is described herein with reference to a READ operation, in other scenarios, in accordance with the HATEOAS architecture, the action may be one of: POST, GET, PUT, or DELETE (sometimes referred to as CREATE, READ, UPDATE, and DELETE, respectively). As previously described, the user identifier may comprise any data, or combination of data, used to determine the permissions of a given user.

At 304, method 300 further comprises determining if the resource operation is authorized based on the request. In some embodiments, such a determination may comprise determining a user identifier based on the request and querying an authorization solver (e.g., authorization solver 216) to determine whether a user corresponding to the user identifier is authorized to perform the resource operation. For example, a kernel of the HTTP server system (e.g., kernel 214) may be configured to determine the user identifier from the request (e.g., by parsing the request), and to query the authorization solver by providing the user identifier. In other embodiments, the entire request and/or a different subset of the request may be provided to the authorization solver. If the resource operation is not authorized, method 300 ends, and thus the resource operation is not performed. In some embodiments, a message indicating the operation failure may be sent to the requesting client.

However, if the resource operation is authorized, method 300 further comprises, at 306, sending the resource operation to an object server associated with the resource identified by the request. For example, as mentioned above, the kernel of the server system may be configured to determine the user identifier by parsing the user request, and such parsing may further comprise parsing a link included in the request to identify the requested resource. In other embodiments, parsing of the link may be performed upon determining that the resource operation is allowed. Nonetheless, determining which particular resource is requested may be accomplished by recognizing a URI of the resource within the request. These scenarios are presented for the purpose of example, and are not intended to be limiting in any manner.

In response to sending the resource operation to the object server, method 300 further comprises, at 308, receiving an object from the object server, where the object represents the resource upon performance of the resource operation. In other words, the object may represent the "result" of the resource operation. For example, as the request includes a GET (READ) action (e.g., retrieve the resource), the object may represent the state of the resource upon performance of the GET action. In other embodiments where the request includes a POST (UPDATE) action (e.g., update the resource with new information), the object may represent the state of the resource after the resource has been updated with the new information.

At 310, method 300 further comprises embedding, in the object, a content type identifier (e.g., TYPE 116) indicating a content type of the object and a resource location identifier (e.g., HREF 118) indicating a location of the resource. As mentioned previously, typical HATEOAS systems embed such identifying information within the HTTP header itself. However, as this increases dependency upon the HTTP protocol itself, such a configuration may not provide suitable extensibility and/or may be otherwise undesirable. Accordingly, by embedding the information within the object, the identifying information remains with the object while freeing the HTTP header to provide the "standard" functionality.

As described above, handling of a READ operation may include not just returning a particular object (if at all), but may also comprise determining related information. For example, if the request received at 302 includes a request for an online shopping cart, merely returning the shopping cart object (e.g., cart comprising a list of items) without related information (e.g., price, inventory, etc.) may be undesirable. In such scenarios, the client may be configured to provide one or more calls for the additional information, thereby increasing the complexity of the client and/or decreasing throughput. As such, it may be desirable to both determine the related information and attach the information to the object before returning the object to the requesting client.

Accordingly, at 312, method 300 further comprises providing, via a linking engine (e.g., resource linker 218), the object to each link resource server of the one or more link resource servers. As discussed above, the resource linker is configured to query each of the resource servers to determine if said resources servers are aware of any information related to the resource operation. Said querying may be accomplished, for example, by utilizing the method of FIG. 3. In other words, the linker may query the resource servers by constructing a resource operation for each resource server. In some embodiments, authorization may be performed instead of, or in addition to, the authorization performed at 304. For example, authorization may be performed upon receiving the object and/or before providing each linking resource operation.

As said resource operations result from a "primary" resource operation, said resource operations may be referred to as "secondary" resource operations. By allowing non-kernel elements of the microkernel to query other elements, each element does not need to be "aware" of the state of any other resource since the state can be queried as needed. Such a configuration ensures that only the appropriate resource server acts upon a given resource operation, and that any other resource server must interact with the resource server instead of directly accessing the resource.

In order to provide the related information, each link resource server may be configured to examine the (embedded) content type of the object. Generally speaking, each link resource server includes "linking rules" (e.g., business rules, other logic, etc.) for one or more object types. Accordingly, upon recognizing the content type of the object as a content type for which linking rule(s) exist, each resource server is configured to return one or more links according to the linking rules corresponding to the content type of the object. As mentioned above, if a particular link resource server does not recognize the object type, or otherwise cannot provide a response to the query, the link resource server may be configured to provide a "default action." It will be understood that each resource server receives the object, and does not receive any links provided by the other resource servers. In other words, there may exist no predefined order by which the resource servers are queried, and instead the resource servers may be queried in any particular order, so long as each of the link resource servers is queried. In some embodiments, two or more of the resource servers may be queried in parallel.

Thus, in response to the provision at 312, method 300 further comprises, at 314, receiving one or more links from each of the one or more link resource servers. In some instances, there may be no suitable links. At 316, method 300 further comprises embedding the links in the object (e.g., within a "links" data structure/field/etc.). Upon embedding the links, method 300 comprises sending the object to the requesting client via the computer network at 318.

Figure 4:
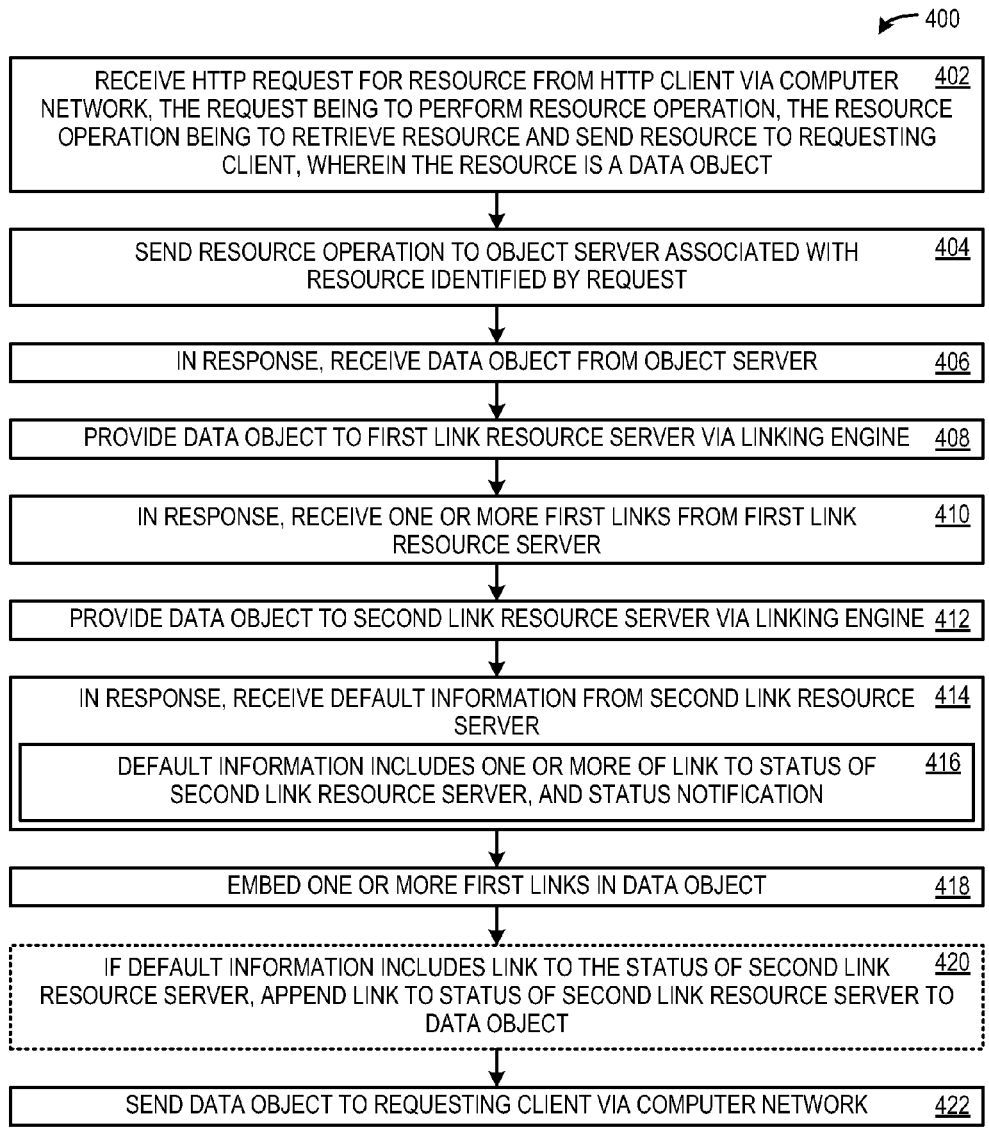
FIG. 4 is a flowchart illustrating a method of operating a stateless microkernel architecture server in accordance with one embodiment of the present disclosure.

Turning now to FIG. 4, a process flow depicting an embodiment of a method 400 for operating a stateless microkernel architecture server including a first link resource server and a second link resource server is illustrated. At 402, method 400 comprises receiving an HTTP request for a resource from an HTTP client via a computer network, the request being to perform a resource operation, the resource operation being to retrieve the resource and send the resource to the requesting client, wherein the resource is a data object.

At 404, method 400 comprises sending the resource operation to an object server associated with the resource identified by the request. At 406, method 400 further comprises, in response, receiving the data object from the object server, and, at 408, embedding, in the data object, a content type identifier indicating the a content type of the data object and a resource location identifier indicating a location of the resource. In other words, the requested data object has been received and the identifier(s) have been embedded in the object. However, it will be appreciated from the preceding discussion that one or more link resource servers may maintain information that is related to the data object.

Accordingly, at 408, method 400 further comprises providing the data object to the first link resource server via a linking engine. In response, at 410, method 400 further comprises receiving one or more first links from the first link resource server. Similarly, at 412, method 400 comprises providing the data object to the second link resource server via the linking engine, Method 400 further comprises, at 414, in response, receiving default information from the second link resource server. The default information may be received, for example, if the second link resource server does not maintain information related to the object and/or if the second link resource server is unavailable. As previously mentioned and as illustrated at 416, the default information may include one or more of a link to a status of the second link resource server, and a status notification.

Method 400 further comprises, at 418, embedding the one or more first links in the data object. In some embodiments, method 400 may further comprise, at 420, if the default information includes the link to the status of the second link resource server, appending the link to the status of the second link resource server to the data object before sending the object to the requesting client. In other words, if the default information includes a link, the link is embedded in the object. At 422, method 400 further comprises sending the object to the requesting client via the computer network.

As described above, one potential advantage of utilizing the REST HATOEAS software architecture is the ability to represent, and to effect a change in, application state over a computer network via linked hypermedia. For example, by sending a POST request including data to be posted to a server, a corresponding resource on the server may be updated to reflect the posted data. After the resource has been updated, typical REST HATEOAS server systems may be configured to return a link to the client that indicates the location of the updated resource. The client may subsequently utilize the returned link to retrieve the updated object by sending a GET request for the resource based on the link. In other words, in order to both effect a system state transition and retrieve object(s) modified thereby, a client in a typical REST HATEOAS system may be expected to provide two different requests to the server. Such a configuration may thus be undesirable, for example, due to decreased throughput caused by the increased network traffic.

Figure 5:
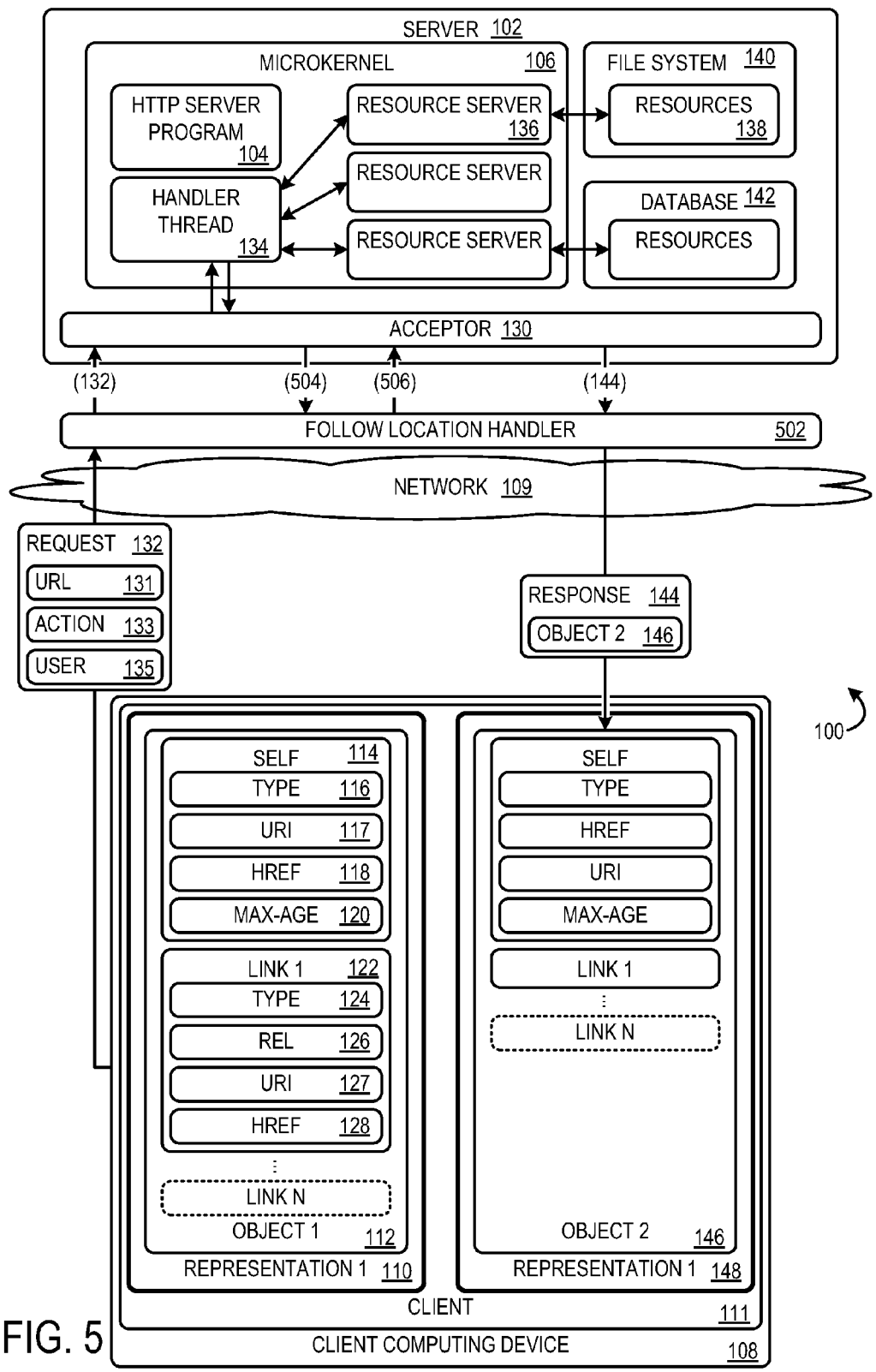
FIG. 5 shows the system of FIG. 1 comprising a follow location handler in accordance with an embodiment of the present disclosure.

It will therefore be appreciated that it may be desirable to provide streamlined mechanism(s) for providing state transitions in a client-server system. Turning now to FIG. 5, the example HATEOAS-based client-server system 100 of FIG. 1 is illustrated. However, FIG. 5 further comprises follow location handler 502 logically positioned between server 102 and client 111. In other words, the follow location handler is logically positioned on a WAN side of server 102. Although follow location handler is illustrated as being external to server 102, generally speaking, follow location handler 502 may be executed on a same computing device as HTTP server program 104, or on a computing device connected via a LAN (not illustrated) to the computing device on which the HTTP server is executed. In some embodiments, server 102 may be unaware that follow location handler is interacting with the network traffic.

As previously described with reference to FIG. 1, client 111 is configured to follow a particular link of links 122 embedded in object 112 by sending request 132 to server 102 via network 109. In the previous discussion, if the request is operable to retrieve a particular resource of resources 138, response 144 received from the server system comprises the requested object. In contrast, if the request is operable to effect a state transition, such as by posting information to the resource, the response in a typical REST HATEOAS system may comprise a link to the corresponding updated data object. The client may thus be expected to provide a separate READ request to retrieve the object, if desired.

Generally speaking, follow location handler 502 is configured to act as a server-side middleman between server 102 and client 111 by intercepting and selectively forwarding information, such as requests 132 and responses 144, between the sever and the client. In other words, upon recognizing particular requests 132 or responses 144, follow location handler 502 may be configured to forward the requests and the responses to the intended destination. Furthermore, upon recognizing other responses 504 from server 102, follow location handler 502 may be configured to programmatically generate one or more requests 506 to server 102 without providing responses 504 to the client. Example operation of a server system comprising an embodiment of a follow location handler 502 will now be discussed with reference to FIG. 6.

Figure 6:
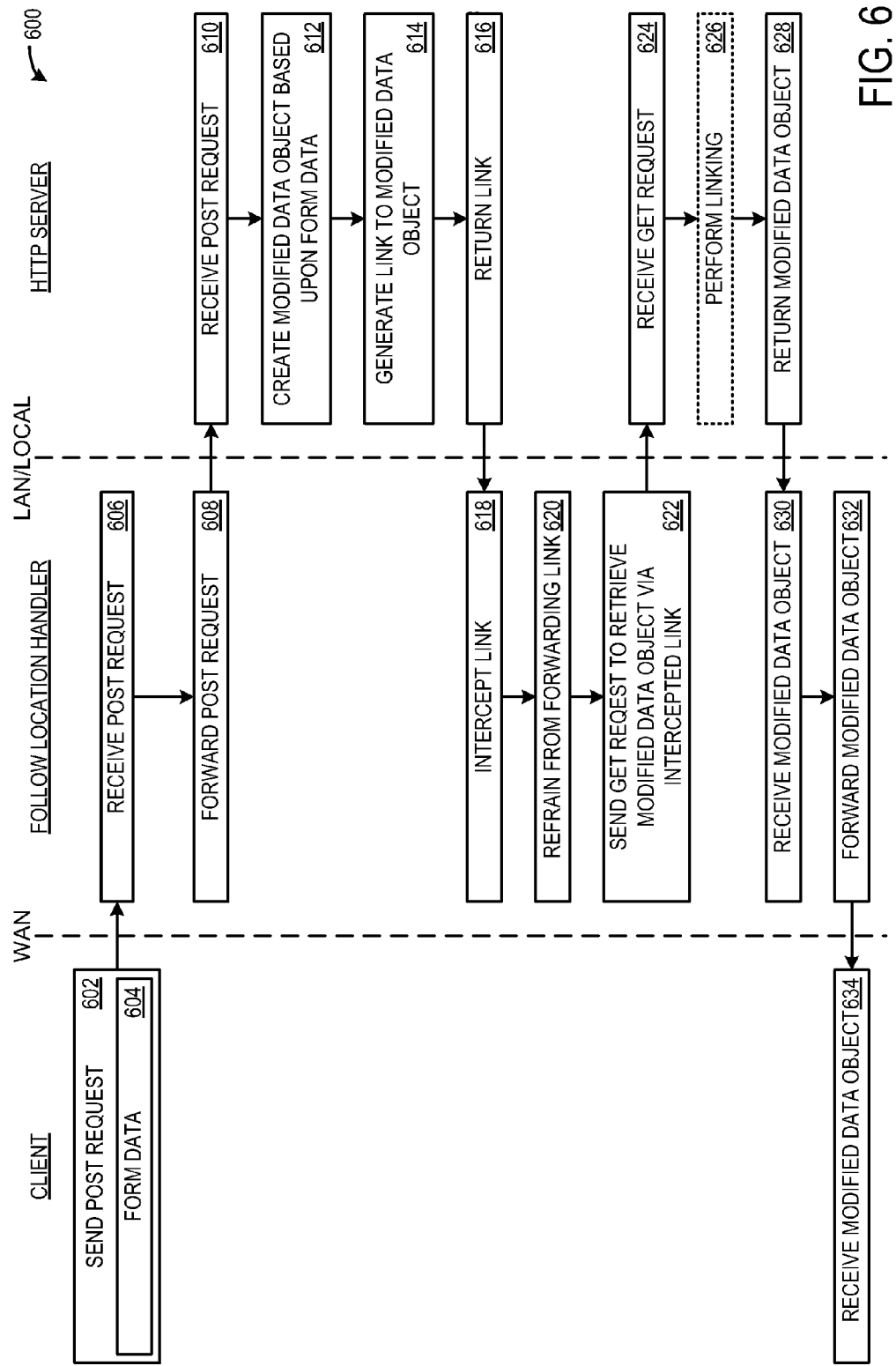
FIG. 6 shows a flowchart illustrating a method of serving a resource from an HTTP server to a client via a computer network in accordance with another embodiment of the present disclosure.

FIG. 6 illustrates a flowchart depicting an embodiment of a method 600 of serving a resource from an HTTP server (e.g., server 102) to a client (e.g., client 111) via a computer network. At 602, the client sends a POST request (e.g., request 132) including form data 604 via the WAN. In other words, the request includes information to be applied to a resource, and the action to be performed on the resource so as to provide such application. A follow location handler (e.g., follow location handler 502), receives the POST request at 606, and, at 608, forwards the POST request to the server system. In other words, the follow location handler may be configured to recognize the received request as a POST request and to subsequently forward the request to the server so that the server can attempt to fill the request.

The server receives the post request at 610, and, at 612, creates a modified data object based upon the form data. In other words, upon posting the form data to the resource, the state of the resource is updated, and the server is configured to update the data object accordingly. Since the request is a POST request, as opposed to a GET request or other operation where one or more objects are to be returned, the server system generates a link to the modified data object at 614, and, at 616, returns the link to the modified object.

In some embodiments, for example, where the follow location handler and the server are substantially cooperating, the server may be configured to send the link to the modified object directly to the follow location handler. In other embodiments, for example, where the follow location handler is substantially transparent to the server, the follow location handler intercepts the link to the modified data object from the server at 618. Regardless of how the link arrives at the follow location handler, the follow location handler refrains from forwarding the link to the requesting client over the WAN at 620. As mentioned above, if the link to the modified data object were to be forwarded to the client, the client would be expected to generate a second request to retrieve the updated object, if desired. In contrast, the follow location handler may be configured to send a GET request to the server to retrieve the modified data object via the intercepted link at 622. In other words, the handler may receive the link, prevent the link from being provided to the client, and programmatically provide a request for the updated data object identified by the link. It will be appreciated that such operation may be substantially transparent to the server and/or the client.

At 624, the server receives the GET request. As previously described with reference to FIG. 2, before returning a requested object, a REST HATEOAS system in accordance with embodiments of the present disclosure may be configured to perform linking in order to embed information related to the object within the object itself. Thus, in some embodiments, the server may be configured to perform linking at 626. Regardless of whether or not such linking is performed, the server system returns the modified data object at 628.

At 630, the follow location handler receives the modified data object, and, in response, forwards the modified data object to the client at 632. The client thus receives the modified data object at 634. Upon receiving the modified data object, the client may be configured, for example, to update the entire representation of the object and/or to update a portion of the representation. In other embodiments, the client may not update the representation. From the discussion of FIG. 6, it will be appreciated that a follow location handler in accordance with embodiments of the present disclosure may be configured to effect a second request, and handle the response thereto, upon recognizing a request from a client. In other words, such a configuration may enable the performance of compound resource operations in a manner that is substantially transparent to the client and/or the server.

In some embodiments, client-server interaction may be related to user-interaction with a form. Forms comprise one or more control objects enabling a user to provide information to the server for further processing. Forms are utilized by many pages on the World Wide Web to provide functionality such as providing user feedback, inputting address and/or payment information, performing search queries, and the like.

Figure 8:
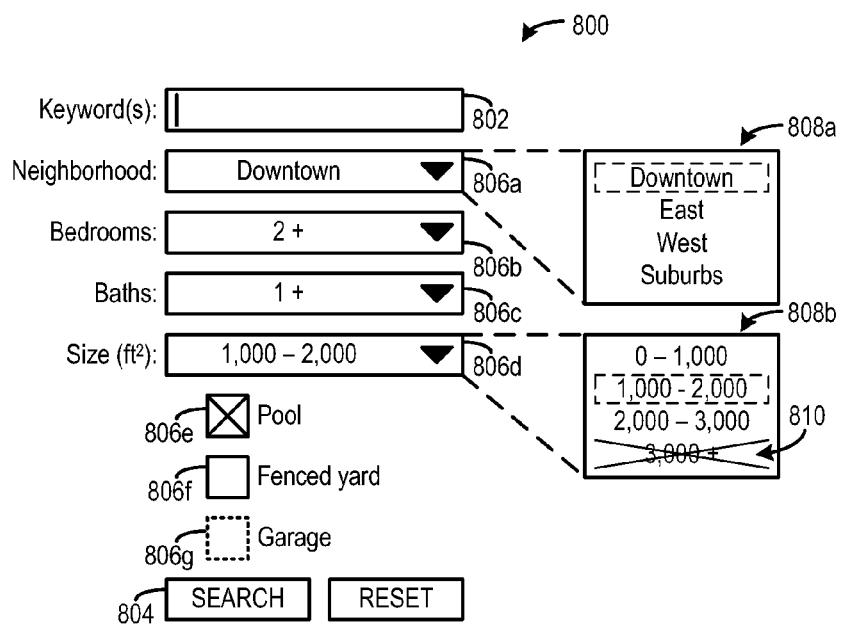
FIG. 8 shows an example of a form comprising a plurality of selector control objects in accordance with embodiments of the present disclosure.

For example, FIG. 8 illustrates an example of an embodiment of a form 800 for performing a real estate search, for example, by querying a real estate database. Form 800 includes text input mechanism 802 to receive text-based form data in the way of one or more keywords. If a user wishes to search via keyword(s), text is entered via mechanism 802 and the form data is submitted upon actuation of POST mechanism 804, illustrated in the form of a "search" button. Returning briefly to FIG. 5, follow location handler 502 may be configured to recognized such a request, and may be further configured to handle response 504 and request 506 such that response 144 returned to client 111 includes an object comprising the search results. In other instances where such follow location functionality is not provided, a link to a search results object may be returned, and the client providing form 800 may be expected to provide a second request to retrieve the search results.

Returning to FIG. 8, manual information entry of form data may be undesirable in some instances, such as, for example, when particular information is constrained to a finite set of allowable information. Therefore, form 800 further comprises selectors 806, such as neighborhood selector 806a, bedroom selector 806b, baths elector 806c, and size selector 806d. Each selector 806 is configured to provide a plurality of selection options 808 for selection by the user. In the illustrated example, neighborhood selector 806a receives input of a desired neighborhood by allowing a user to select a particular selection option from the selection options 808a of "Downtown," "East," "West," and "Suburbs." In other words, a user interacting with form 800 is therefore able to define a state of neighborhood selector 806a by selecting one or more of the selection options of selection options 808a, and the state of selector 806a may not be set to a state that does not correspond to one or more of selection options of selection options 808a. Further, selector 806a may be populated only with selection options 808a that are valid and selectable given the current state of form 800. Relationships between selectors 806 will be discussed in greater detail below.

In some embodiments, form 800 may further comprise selectors 806e, 806f, and 806g. These selectors are illustrated in the form of checkboxes, and are configured to provide two potential states. In other words, selectors 806e, 806f, and 806g enable selection of one of two pre-defined potential states, e.g., TRUE or FALSE, YES or NO, ON or OFF, etc. Although the configuration of selectors 806 is provided for the purpose of example, it will be appreciated that these configurations are not intended to be limiting in any manner.

Before continuing with the discussion of FIG. 8, implementation of selectors via the described improved HATEOAS REST architecture will be described with reference to FIG. 7. As mentioned above, state modifications are typically performed by issuing a POST command to provide form data to a resource, issuing a PUT command to update a resource, and/or issuing a DELETE command for a resource. In some embodiments, a particular current state may correspond to a finite set of potential state transitions. For example, an e-commerce system may be configured to only serve customers living within North America. Accordingly, during checkout, a user of such a system may be able to select a country for a delivery address from a selection of countries in North America. In this way, the business rules limiting sales to North America may be implemented by constraining the selection of shipping destination countries to countries within North America.

Figure 7:
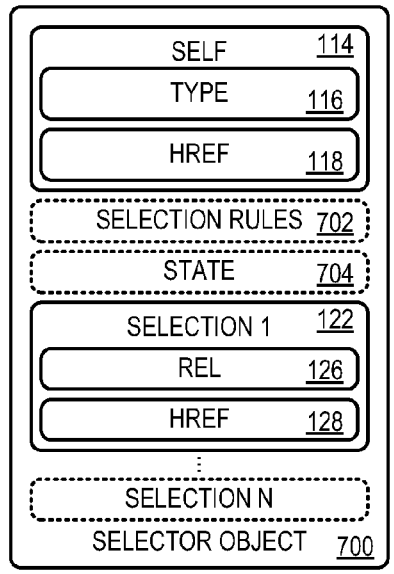
FIG. 7 schematically shows a selector object in accordance with an embodiment of the present disclosure.

FIG. 7 schematically illustrates object 700 in the form of a selector object. From the preceding discussion, it will be appreciated that identification of the object as a selector object is accomplished by defining a selector schema via type 116 of self entity 114. Self entity 114 further includes HREF 118 that points to the location of the resource server that provided selector object 700.

Selector object 700 further comprises a plurality of links 122, referred to herein as "selection options" when embedded in a selector object. As each selection option corresponds to a potential state of the selector object, each link 122 that serves as a selection option includes a description of the selection indicated by REL element 126 and a corresponding action indicated by HREF element 128. For example, in some scenarios, the action may include posting the selection option selected by a user, referred to simply as a "selection," to the resource at location 118. In other words, upon selecting a particular selection link 122, HREF 128 associated with the selection may be followed in order to effect the corresponding state transition.

In some embodiments, selector object 700 may be generated by a selector resource server, and the selector object may be provided to each resource server in order to effect linking of the one or more selection options. Accordingly, if selector object 700 corresponds to an address selection menu, a plurality of selection options 122 may be provided by a user accounts resource server, where each selection option 122 corresponds to a stored address for a user.

As briefly mentioned above, the schema identified by TYPE element 116 may indicate the presence of one or more additional, type-specific fields within the object. Thus, in some embodiments, selector object 700 may further comprise selection rules 702 and/or current state 704. Selection rules 702 may include any one or more rules defining the selection behavior of selector object 700. The selection rules may indicate, for example, how many selectors, if any, may be simultaneously chosen. For example, it may be desirable in an e-commerce scenario to ensure that a user is able to select only one destination country. Current state 704 may be usable to determine the state of the resource on the server that is represented by selector object 700, thereby enabling representation of the current state.

Returning to FIG. 8, relationships between the selectors will now be described. During linking, one or more resource servers may be configured to examine a selector object and, in response, provide one or more selection options for embedding in the object. As each resource may be related to any one or more other resources, it will be appreciated that the provision of one or more of the selection options may depend on the state of one or more other selectors and/or the state of one or more other resources.

Thus, as the user interacts with each selector in the control and makes a selection of a selection option, client side logic in the selector causes a POST command to be programmatically issued upon the client receiving the selection without waiting for the page to be reloaded or the form to be posted by the user via a "submit" selector, etc. Each time a selector state changes in the control, a POST command is issued and the state of the entire control is updated, thus ensuring that only relevant and selectable selection options are presented to the user in the control.

In the illustrated form 800, selection options 808 provided by size selector 806d may depend upon the state of neighborhood selector 806a. For example, if available real estate in the downtown neighborhood is all less than 3,000 square feet, a query for real estate that is both in downtown and over 3,000 square feet may provide zero results, and such a state may not be allowed by an example system. Accordingly, upon selection of the "Downtown" selection option of selection options 808a, the selection may be posted to the server, and an updated selector object corresponding to size selector 806d may be received that does not include the "3,000+" selection. In other embodiments, the updated selector object may include such disabled selection(s) such that the receiving client is able to provide representation 810 of the disabled resource. Although illustrated as a crossed-out selection option of selection options 808b, it will be appreciated that representation 810 is provided for the purpose of example, and that the representation of disabled selectors may have different representations, if any. As another example of relationships between selectors 806, upon selection of the downtown neighborhood, selector 806a providing binary selection options of a garage option may be disabled and set to a FALSE state, indicating that no real estate corresponding to the states of selectors 806 includes a garage. In such instances, selector 806g may be grayed-out or otherwise disabled, as illustrated by the dashed outline, though other representations are possible without departing from the scope of the present disclosure.

Generally speaking, interaction with a computing system is a progression of individual state transitions. As described above, one potential advantage of utilizing the REST HATEOAS software architecture is the ability to represent, and to effect a change in, application state over a computer network via linked hypermedia. For example, a state transition may be effected by sending a POST request including data to a server. Sending of such a command may subsequently effect the above-described linking workflow at the server, and the new state of the system is provided as an updated data object returned to the requesting client. It will be appreciated from the above discussion that each resource server may provide control over the linking workflow by selectively and intelligently providing information.

In other words, each link resource server is able to examine a data object, and may selectively provide, and similarly may selectively withhold, related information known to the link resource server. As one non-limiting example, a particular resource sever may provide an "add to cart" link to an in-stock product object, whereas the same resource may withhold such a link from an out-of-stock product object. In this way, the example link resource server is able to prevent a purchase workflow from proceeding by selectively withholding or the "add to cart" link. In the described example, the example link resource server is able to halt progression of the workflow based on substantially resource server-specific information. That is, the link resource server selectively provides the "add to cart" link based on an understanding of whether or not a particular product is in-stock. In typical use case scenarios, such information may be provided by one or more other link resource servers (e.g., inventory link resource server).

However, as described above, each link resource server may be configured to examine the data object, and may not be aware of link(s) provided by one or more other link resource servers of the system. For example, in a typical e-commerce system utilizing the HATEOAS architecture, a shipping resource server may rely upon information provided by one or more other link resource servers (e.g., a shipping address provided by a customer account resource server) in order to determine shipping costs or estimated delivery time, for example. As the shipping resource would be unaware of the shipping address information provided by the other link resource server, the shipping address would be undefined from the view of the shipping resource server, and the shipping resource server may thus not attach the shipping information to the data object.

As it is typically undesirable to create a purchase without identifying a shipping address, such systems may utilize additional logic to verify that such information is provided before allowing a state transition (e.g., product purchase) to occur. Generally speaking, it may be desirable to ensure that all critical information is attached to the object before allowing the state transition. It will be appreciated that this scenario is simplified for ease of understanding, and that practiced HATEOAS systems may experience a plurality of interdependencies among a plurality of resource servers. For example, with reference to the above described example, a shipping resource server on a typical HATEOAS server may rely upon address information, product weight and/or physical dimension information, product inventory information, and/or other information in order to determine applicable shipping link(s), and this information may be provided in any combination via any number of individual resource servers.

Accordingly, it will be appreciated that it may be desirable to provide mechanism(s) by which each resource server may halt the workflow upon occurrence of one or more critical conditions not being met. For example, a particular type of link, referred to herein as a stop condition link, may be attached to a data object during linking to prevent further state transitions from occurring until the condition has been satisfied, which may occur for example, by a user inputting missing information, making a selection of a required option, or selecting a different option, etc. Although examples provided herein are directed toward a product purchase state transition, it will be appreciated that stop condition links may be usable to control other state transitions without departing from the scope of the present disclosure. By providing such a mechanism, it may be possible for each link resource to halt the workflow without impacting the extensibility of the HATEOAS architecture. In other words, business rules may be updated and/or new link resources server may be added, and the link resource servers may be able to enforce the updated logic (e.g., by applying stop condition(s)) without undue burden.

Figure 9:
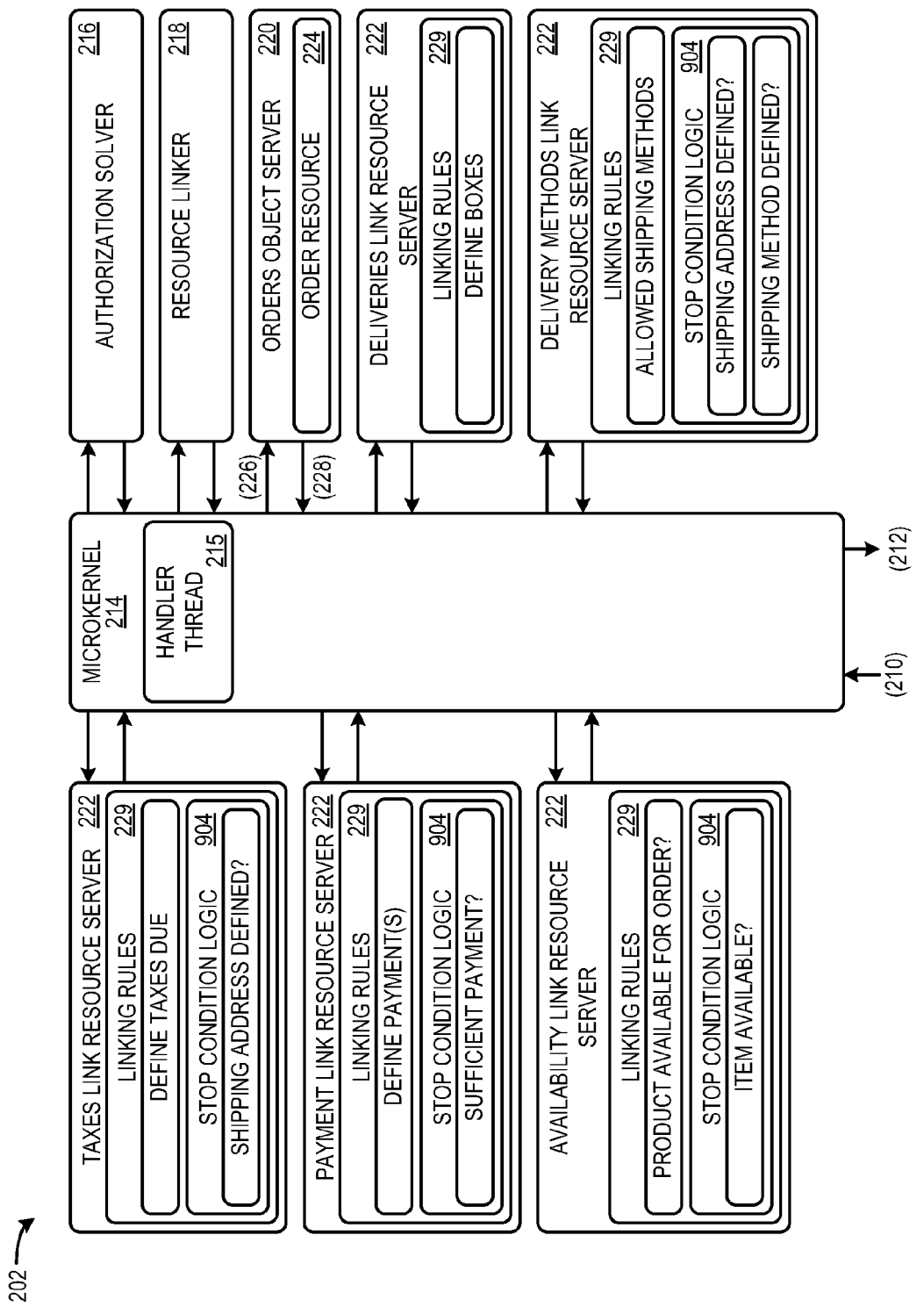
FIG. 9 shows a non-limiting example of a HATEOAS microkernel providing stop condition functionality in accordance with an embodiment of the present disclosure.

Turning now to FIG. 9, server 202 of FIG. 2 is shown including object server 220 and a plurality of link resource servers 222 each implementing linking rules 229 including stop condition logic 904. Specifically, the example server provides electronic commerce functionality, and an example request-response workflow of server 202 for attempting a purchase is as follows.

In order to effect a purchase, request 210 received from a client may include, for example, a request to POST information to the orders object resource server. Operation request 226 based on request 210 is provided to the orders object server 220, and data object 228 based on orders resource 224 is returned. Object 228 may describe, for example, the contents (e.g., one or more products and/or services) of an online shopping cart. Upon receiving the data object, kernel 214 provides the data object to resource linker 218 to effect one or more linking operations. As described above, linker 218 presents the data object to each of the link resource servers 222, and each link resource server examines the data object (e.g., via analysis of known data field(s)) for pre-defined information (e.g., TYPE 116). As a result of such examination, each link resource server is configured to provide zero or more links according to resource-specific linking rules 229.

Previous discussions regarding such linking operations were provided with reference to implementation of resource-specific business logic. For example, in the depicted configuration, the taxes link resource server 222 includes linking rules 229 defining how much tax, if any, to charge for a particular purchase. Such determination may rely upon, for example, a shipping address (e.g., state/province and/or country), a product type (e.g., tax-exempt), user account information (e.g., association with tax-exempt entity), and the like. Such information is expected by the taxes link resource server to be included with the data object 228 (e.g., via previous linking operations) or otherwise available to the taxes link resource server (e.g., within a corresponding tax resource). If such information is available, the example taxes link resource server may be configured to supply one or more links indicating an amount of tax to add to apply particular product(s). However, if such information is not available, the taxes link resource server may be configured to not return any links. Links are collected from each of the remaining link resource servers, as described above, and the links are subsequently embedded in the data object before the object is returned to the requesting client.

In this example scenario, the requesting client may be expected to ensure that the returned data object includes all necessary links to provide a particular state transition (e.g., product purchase). In other words, the client may be expected to examine the data object and determine, for example, whether or not the appropriate taxes link(s) were embedded by the resource linker. If such verification were not provided, it may be possible for a purchase state transition to occur without necessary taxes and/or other critical information being included. However, as the interdependencies between the various links may be complex, the implementation of the additional logic at the client may result in a client of unsuitably large size, which may be undesirable in some scenarios (e.g., mobile computing scenarios). Further, a client-side implementation may be undesirable, for example, as such a configuration relies upon the described additional logic being provided by each and every client. Thus, upon update of the business rules (e.g., change in tax rules, introduction of fees or levies, etc.), each client device must be subsequently updated, thereby negatively impacting the extensibility of the HATEOAS-based system.

It will thus be appreciated that it may be desirable to provide mechanism(s) by which the various resource servers may impart control (e.g., halt progression) over a server-side workflow without violating other tenets of the described REST HATEOAS architecture, namely that each resource server is substantially independent of each other resource server. It may further be desirable, once the workflow has been modified, to provide mechanism(s) for elucidating such modification (e.g., alerts, etc.) and/or for correcting the underlying causes of the modification (e.g., information input mechanisms).

Accordingly, linking rules 229 of each link resource server 222 may further implement stop condition logic 904 configured to determine if a predefined condition has been met, such as whether critical information has been included in data object 208. Critical information may be defined as information without which the transaction cannot be completed, such as a required user input, or required condition of the system, etc. One specific example of such critical information might be entry of a confirmable shipping address, and another might be a failure of the user to check the box agreeing to the terms of use for the website. Another example of such critical information might be a system condition such as the existence currently available inventory to satisfy an order, and another might be that the shipping address is within the United States. It will be appreciated that critical information will be defined within the logic of the stop conditions themselves. If information critical to a particular link resource server is not included, that resource server may be configured, based on stop condition logic 904, to provide one or more stop condition links during interaction with resource linker 218. The stop condition links may be provided according to the underlying link schema employed by the system, thereby preserving the extensibility of the system. That is, a "REL" element (e.g., element 126), which is configured to identify a name of the particular relationship, may be assigned a value common to all stop condition links, such as, for example, "needinfo." Accordingly, mechanisms configured to detect such stop condition links, which will be discussed in greater detail below, may be configured to examine the link(s) embedded in the data object and determine if any of the links include such a REL element 126.

Since the stop condition links often represent the absence of information needed for a particular state transition, it may be desirable to provide mechanisms by which the missing information may be acquired. With this in mind, it will be appreciated that the employed link schema may already provide such mechanisms. Namely, an "href" element (e.g., element 128) identifying the "destination" of the link may identify a location of one or more mechanisms (e.g., a user input/selection mechanism) usable to satisfy the issue(s) effecting in the stop condition. In some embodiments, a "selector" object, as discussed above, may be used to resolve such issues, where the selection option(s) of the selector object are selectable by the user to specify the pre-determined information. In other embodiments, additional and/or different mechanisms may be used without departing from the scope of the present disclosure. In some scenarios, the href element may provide notification of the stop condition link (e.g., error message) instead of, or in addition to, providing mechanisms to satisfy the issue(s). Generally speaking, by providing a consistent, system-wide stop condition schema, the extensibility of an implementing system may be maintained across system updates.

Returning to the example workflow, each link resource server 222 is queried by resource linker 218, and each of the link resource servers provides one or more link(s), some of which may be stop condition links, in response. As described above, the resource linker is configured to embed the links in the data object before the data object is returned to the requesting client. In the case of stop condition links, the resource linker may be configured to first determine whether or not any of the stop condition links have matching link targets. As mentioned above, the target (i.e., href) of each stop condition link provides information regarding the cause of the stop condition and/or mechanisms for specifying the missing information. Accordingly, it will be appreciated in some scenarios that more than one stop condition link may include the same target, as a single piece of missing information may effect a plurality of linking rules 229.

For example, as illustrated, both the taxes link resource server and the delivery methods link resource server implement stop condition logic 904 regarding whether or not a shipping address has been defined. In other words, if a shipping address has not been defined, neither the taxes link resource server nor the delivery methods link resource server is able to provide its relevant information (i.e., taxes due and shipping method/price). As such, both the taxes link resource server and the delivery methods resource server may be configured to provide, in response to receiving the data object, a stop condition link directed towards a mechanism (e.g., address selector, address input mechanism, etc.) to define the missing shipping address. In other words, the stop condition links provided by each of the two link resource severs may be satisfied by input of the same information, and thus access of the same link target.

Accordingly, the resource linker may be configured to examine the link(s) received from the various link resource severs 222, and may embed only one instance of each stop condition link. In other words, if two or more stop condition links include the same link target, the resource linker may embed only one instance of the target. In this way, the missing information may be defined once instead of multiple times, thereby potentially providing a more streamlined and less error-prone user experience. Further, the size of the returned data object may be decreased by not including redundant information, thereby potentially increasing performance and/or decreasing a computation burden on each client device.

Upon embedding the appropriate link(s) in the data object, the resource linker may be configured to determine what is to be returned to the requesting client. In previous discussions, the resource linker merely returned the data object 228 to the client. In other words, if no stop condition links are embedded in the data object, the data object may be sent to the requesting client as described above. However, it will be appreciated from the discussion of the REST HATOEAS architecture that the returned data object defines the potential state transitions. Accordingly, as the presence of one or more stop conditions within the data object precludes such state transitions, it will be appreciated that the resource linker may provide additional consideration when stop condition links are present in the data object.

Thus, in some embodiments, resource linker 218 may be configured to examine the data object, and, if stop condition link(s) are present in the embedded object, may return a list of the one or more stop condition links to the requesting client. In this way, by returning only the stop condition links, the client may be provided with an opportunity to define the missing information before the particular state transition is performed (e.g., by receiving the updated data object). Although described as a "list," it will be appreciated that the stop condition links may be provided in any suitable configuration without departing from the scope of the present disclosure.

In other embodiments, the data object and embedded link(s) may be examined via mechanisms other than resource linker 218. For example, in such embodiments, one or more of the resource servers may be defined as a "state transition" resource server. (e.g., online checkout resource server) that is configured to examine the stop condition link(s) provided by the one or more link resource servers. It will be appreciated that these examples are intended to be non-limiting, and various mechanism may be configured to prevent a workflow upon recognition of one or more stop condition links without departing from the scope of the present disclosure.

To this point, stop conditions have been described as "chokepoints" within a workflow that may temporarily halt the workflow until particular information is received or otherwise defined. However, it will be appreciated that, in some scenarios, the particular information may be permanently unavailable. For example, the illustrated availability link resource server is configured to determine whether or not a particular item is available for purchase. Thus, if an item is temporarily out of stock, the resource server may be configured to, for example, restrict purchase state transitions until the item is available or may allow backordering of the item. However, if the item is permanently unavailable (e.g., production ceases, one-off item, etc.), the missing information (i.e., available inventory) will never become available. Thus, in some embodiments, each resource server 222, based on stop condition logic 904, may provide a "critical stop condition link" in such scenarios. Such a critical stop condition link may include a "REL" element (e.g., element 126) having an assigned value common to all critical stop condition links, such as, for example, "stopinfo." A critical stop condition link identifies that the condition for the particular pre-determined information cannot be acquired or satisfied, thereby indicating that the present workflow cannot continue.

Turning now to FIG. 10, a process flow depicting a method 950 of serving a resource to a client via a computer network is shown. At 952, method 950 comprises, at handler 215, receiving an HTTP request from an HTTP client via a computer network to perform a resource operation on a resource, wherein the resource is a data object. At 954, method 950 further comprises sending a request to perform the resource operation to an object server associated with the resource, and, in response, receiving 956 the data object from the object server upon performance of the resource operation by the object server. For example, the resource operation may include posting form data to the resource, and the data object received from the object server may be a modified data object created based upon the form data. In an electronic commerce scenario, the form data may comprise an online shopping cart posted to an orders resource, and the modified data object may include an order object created based on the online shopping cart. It will be appreciated that these scenarios are presented for the purpose of example, and are not intended to be limiting in any manner. At 958, the method comprises sending the data object to each of the one or more link resource servers in order to effect linking operations, as described above. As described above, the link resource servers may be queried in an order-agnostic and/or substantially parallel manner in some embodiments, though other configurations are possible without departing from the scope of the present disclosure.

Thus, method 950 further comprises, at each link resource server 222, receiving 960 the data object from the handler. At 962, the method further comprises examining the data object for pre-determined information to perform a linking operation. As described above, each link resource server is configured to examine 964 the data object for particular pre-determined information (e.g., information "critical" to a particular state transition), and provide related information known to the link resource sever. Thus, if the data object includes the pre-determined information, method 950 further comprises performing the linking operation by returning 966 one or more links to the handler linking to related information provided by the link resource server. However, if the data object does not include the pre-determined information, method 950 comprises not performing the linking operation and instead returning 968 one or more stop condition links indicating that the pre-determined information is not included. In summary, each link resource server may be configured to examine the data object for particular pre-determined information, and may affect the workflow, either by halting the workflow or providing information relevant to the workflow, based on such examination. From this discussion, it will be appreciated that each link resource server may be configured to operate substantially independently of each other link resource server, while still cooperating with the other resource servers to implement interdependent, complex business rules via the described linking operations.

Method 950 further comprises, at a linking engine executed by the server (e.g., linker 218), receiving 970 the links from each link resource server and embedding 972 the links in the data object. Method 950 further comprises, at 974, sending a response to the HTTP client via the computer network. As mentioned above, the behavior of the resource linker may depend on whether or not any stop condition links are embedded in the data object, and thus whether or not a particular state transition is allowed. For example, if no stop condition links are present in the data object, the response may comprise the data object itself, as shown at 976. However, if the data object does include one or more stop condition links, the response may instead comprise a list of stop condition links, as shown at 978. As mentioned above, such a list may be rendered at the client device so as to enable definition of the missing pre-determined information. In other words, each stop condition link embedded in the data object may be usable by the HTTP client to acquire a mechanism to enable specification or acquisition of the pre-determined information, such as, for example, a selector object comprising one or more selection options. In other embodiments, the list of stop conditions may instead alert a user to the stop condition links (e.g., via one or more error messages), but may not included mechanism(s) by which the missing information may be defined. It will be appreciated that these scenarios are presented for the purpose of example, and are not intended to be limiting in any manner.

The above systems and methods may be utilized to realize a complex, stateful system according to the REST HATEOAS architecture. Generally speaking, by clustering business rules and/or other logic associated with a particular resource around the associated resource server, each resource may be individually maintained while still providing for instantiation of inter-resource relationships. For example, such a configuration may enable the provision of complex forms including a plurality of interrelated selectors. Further, as each resource server is substantially independent of the other resource servers, such a configuration may provide greater extensibility by enabling resource-granular updating of the logic. Yet further, by implementing the complex logic within the server as opposed to the clients, the described systems may potentially allow for lighter-weight client(s) as compared to typical client-server systems.

The above systems and methods may be further usable to provide streamlined mechanisms for handling network-based state transitions. For example, by providing a follow location handler configured to selectively intercept information so as to programmatically affect further requests to a server, a single request may be provided to both effect a state change and retrieve an updated object without defining any specialized instructions.

The above systems and methods may be yet further usable to provide workflow control over network-based state transition workflows. For example, by providing an extensible linking schema including stop condition links, control over a global state transition workflow may be affected by the various, independent link resource servers without compromising the tenants of the REST HATEOAS architecture.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of serving a resource to a client via a computer network with an HTTP server system having a stateless microkernel architecture, the server system including two or more link resource servers comprising at least a first link resource and a second link resource server, the method comprising:
   at a handler executed by a server of the HTTP server system, the server including a processor and memory;
   receiving an HTTP request from an HTTP client via the computer network to perform a resource operation on a resource, wherein the resource is a data object configured to embed at least two links comprising at least a first link and a second link;
   sending a request to perform the resource operation to one or a plurality of object servers associated with the links;
   in response, receiving the data object from the one or the plurality of object servers upon performance of the resource operation by the one or the plurality of object servers;
   sending the data object to each of the two or more link resource servers; at the first link resource server executed by the server,
   receiving the data object from the handler;
   determining by examining the data object, whether pre-determined information associated with the first link is present in the data object to perform a linking operation;
   based on the determining, when the data object includes the pre-determined information associated with the first link, performing the linking operation by returning the first link to the handler linking to related information provided by the first link resource server;
   further based on the determining, when the data object does not include the pre-determined information, not performing the linking operation and instead returning one or more stop condition links indicating that the pre-determined information is not included; and
   further based on the determining, when the data object includes the pre-determined information associated with the first link, at a linking engine executed by the server,
   receiving the first link from the first link resource server; and
   embedding the first link in the data object; and
   sending a response to the HTTP client via the computer network,
   then at the second link resource server executed by the server,
   receiving the data object from the handler;
   determining by the examining the data object whether pre-determined information associated with the second link is present in the data object, to perform a linking operation;
   based on the determining whether the pre-determined information associated with the second link is present in the data object,
   when the data object includes the pre-determined information associated with the second link, performing the linking operation by returning the second link to the handler linking to related information provided by the second link resource server; and
   when the data object does not include the pre-determined information, not performing the linking operation and instead returning one or more stop condition links indicating that the pre-determined information is not included;
   wherein the response comprises the data object if none of the links are stop condition links, and wherein the response comprises a list of stop condition links if one or more of the links are stop condition links;
   wherein the predetermined information associated with each of the first and second links is information critical to a respective state transition effected on the data object by the first resource server and the second resource server, respectively.

2. The method of claim 1, the resource operation being to post form data to the resource, wherein the data object received from the object server is a modified data object created based upon the form data.

3. The method of claim 2, wherein the stop condition link is a critical stop condition link indicating that the condition for the pre-determined information cannot be satisfied and therefore a present workflow cannot continue.

4. The method of claim 2, wherein the resource is an orders resource, wherein the form data comprises an online shopping cart, wherein the modified data object is an order object created based on the online shopping cart.

5. The method of claim 4, wherein the one or more link resource severs include a shipping resource server, the shipping resource returning a stop condition link if the order object does not include a shipping address.

6. The method of claim 4, wherein the one or more link resource servers include an inventory resource server, the inventory resource returning a critical stop condition link if a particular item of the online shopping cart is permanently unavailable.

7. The method of claim 1, the resource operation being to retrieve the resource and send the resource to the requesting client, wherein each stop condition link embedded in the data object is usable by the HTTP client to acquire a mechanism to enable specification or acquisition of the pre-determined information.

8. The method of claim 7, wherein the mechanism is a selector object comprising one or more selection options selectable by the user to specify the pre-determined information.

9. The method of claim 1, further comprising at the linking engine:
identifying two or more matching stop condition links received from the link resource servers having matching link targets; and
embedding only one of the matching stop condition links.

10. The method of claim 1, wherein the data object is provided to the one or more link resource servers in an order agnostic manner.

11. The method of claim 1, wherein the server is an e-commerce platform.

12. A server computing system, comprising:
a handler instantiated on a server device including a processor and memory, and configured to:
receive an HTTP request from an HTTP client, instantiated on a client computing device, via the computer network to perform a resource operation on a resource, wherein the resource is a data object configured to embed at least two links comprising at least a first link and a second link,
send a request to perform the resource operation to one or a plurality of object servers associated with the links and instantiated on the server device;
in response, receive the data object from the one or the plurality of object servers upon performance of the resource operation by the one or the plurality of object servers, and
send the data object to each of two or more link resource servers comprising at least a first link resource server and a second link resource server instantiated on the server device;
the first link resource server configured to:
receive the data object from the handler,
determine by examining the data object, whether pre-determined information associated with the first link is present in the data object to perform a linking operation,
based on the determination whether predetermined information associated with the first link is present in the data object, when the data object includes the pre-determined information associated with the first link, perform the linking operation by returning the first link to the handler linking to related information provided by the first link resource server;
further based on the determination, when the data object does not include the pre-determined information, not perform the linking operation and instead return one or more stop condition links indicating that the pre-determined information is not included; and
at linking engine instantiated on the server device and configured to:
when the data object includes the pre-determined information associated with the first link,
receive the first link from the first link resource server; and
embed the first link in the data object; and
send a response to the HTTP client via the computer network,
the second link resource server configured to:
receive the data object from the handler;
determine by examining the data object whether pre-determined information associated with the second link is present in the data object, to perform a linking operation,
based on the determination whether the pre-determined information associated with the second link is present in the data object, when the data object includes pre-determined information associated with the second link, perform the linking operation by returning the second link to the handler linking to related information provided by the second link resource server; and
further based on the determination whether the pre-determined information associated with the second link is present in the data object, when the data object does not include the pre-determined information, not perform the linking operation and instead return one or more stop condition links indicating that the pre-determined information is not included;
wherein the response comprises the data object when none of the links are stop condition links, and wherein the response comprises a list of stop condition links when one or more of the links are stop condition links; and
wherein the predetermined information associated with each of the first and second links is information critical to a respective state transition effected on the data object by the first resource server and the second resource server, respectively.

13. The server computing system of claim 12, the resource operation being to post form data to the resource, wherein the data object received from the object server is a modified data object created based upon the form data.

14. The server computing system of claim 12, wherein the one or more stop condition link is a critical stop condition link if the pre-determined information cannot be acquired, the critical stop condition link identifying the pre-determined information cannot be acquired.

15. The server computing system of claim 12, the resource operation being to retrieve the resource and send the resource to the requesting client, wherein each stop condition link embedded in the data object is usable by the HTTP client to acquire a mechanism to enable specification or acquisition of the pre-determined information.

16. The server computing system of claim 15, wherein the mechanism is a selector object comprising one or more selection options selectable by the user to specify the pre-determined information.

17. The server computing system of claim 15, wherein the mechanism is an input mechanism usable by the user to input the pre-determined information.

18. The server computing system of claim 12, further comprising at the linking engine:
identifying two or more matching stop condition links received from the link resource servers having matching link targets; and
embedding only one of matching stop condition links.

19. The server computing system of claim 12, wherein the data object is provided to the one or more link resource servers in an order agnostic manner.

20. The server computing system of claim 12, wherein the server device is an e-commerce platform.

21. A method of serving a resource to a client via a computer network with an HTTP server system having a stateless microkernel architecture, the server system including two or more link resource servers comprising at least a first link resource server and a second link resource server, the method comprising:
- at a handler executed by a server of the HTTP server system, the server including a processor and memory
  - receiving an HTTP request from an HTTP client via the computer network to perform a resource operation on a resource, wherein the resource is a data object configured to embed at least two links comprising at least a first link and a second link;
  - sending a request to perform the resource operation to one or a plurality of object servers associated with the links;
  - in response, receiving the data object from the one or the plurality of object servers upon performance of the resource operation by the one or the plurality of object servers;
  - sending the data object to each of the two or more link resource servers;
- at the first link resource server executed by the server,
  - receiving the data object from the handler;
  - determining by examining the data object, whether pre-determined information associated with the first link is present in the data object, to perform a linking operation;
  - based on the determining whether pre-determined information associated with the first link is present in the data object, when the first link resource server includes pre-determined information associated with the first link, performing a linking operation by returning the first link to the handler linking to related information provided by the first link resource server;
  - further based on the determining, when the first link resource server does not include the pre-determined information, not performing the linking operation and instead returning one or more stop condition links indicating that the pre-determined information is not included;
  - further based on the determining, when the first link resource server includes the pre-determined information associated with the first link, at a linking engine executed by the server,
  - receiving the first link from the first link resource server;
  - embedding the first link in the data object; and
  - sending a response to the HTTP client via the computer network, then at the second link resource server executed by the server,
  - receiving the data object from the handler;
  - determining by examining the data object whether pre-determined information associated with the second link is present in the data object, to perform a linking operation;
  - based on the determining whether the pre-determined information associated with the second link is present in the data object,
  - further based on the determining when the second link resource server includes pre-determined information associated with the second link, performing a linking operation by returning the second link to the handler linking to related information provided by the second link resource server; and
  - further based on the determining, when the second link resource server does not include the pre-determined information, not performing the linking operation and instead returning one or more stop condition links indicating that the pre-determined information is not included;

wherein the response comprises the data object when none of the links are stop condition links, and wherein the response comprises a list of stop condition links when one or more of the links are stop condition links;

wherein the pre-determined information associated with each of the first and second links is information critical to a respective state transition effected on the data object by the first resource server and the second resource server, respectively.

22. A server computing system, comprising:
- a handler instantiated on a server device including a processor and memory and configured to:
- receive an HTTP request from an HTTP client, instantiated on a client computing device, via the computer network to perform a resource operation on a resource, wherein the resource is a data object configured to embed at least two links comprising at least a first link and a second link,
- send a request to perform the resource operation to one or a plurality of object servers associated with the links and instantiated on the server device,
- in response, receive the data object from the one or the plurality of object servers upon performance of the resource operation by the one or the plurality of object servers, and
- send the data object to each of the two or more link resource servers comprising at least a first link resource server and a second link resource server instantiated on the server device;
- the first link resource server configured to:
  - receive the data object from the handler,
  - determine by examining the data object whether pre-determined information associated with the first link is present in the data object, to perform a linking operation,
  - based on the determination whether the pre-determined information associated with the first link is present in the data object, when the first link resource server includes pre-determined information associated with the first link, perform a linking operation by returning the first link to the handler linking to related information provided by the first link resource server, and
  - further based on the determination, when the first link resource server does not include the pre-determined information, not perform the linking operation and instead return one or more stop condition links indicating that the pre-determined information is not included; and
- a linking engine instantiated on the server device and configured to:
  - when the first link resource server includes the pre-determined information associated with the first link,
  - receive the first link from the first link resource server; and
  - embed the first link in the data object; and
  - send a response to the HTTP client via the computer network, the second link resource server configured to:
  receive the data object from the handler,
  determining by examining the data object whether pre-determined information associated with the second link is present in the data object, to perform a linking operation,
  based on the determination whether the pre-determined information associated with the second link is present when the second link resource server includes pre-determined information associated with the second link, perform a linking operation by returning the second link to the handler linking to related information provided by the second link resource server, and
when the second link resource server does not include the pre-determined information, not perform the linking operation and instead return one or more stop condition links indicating that the pre-determined information is not included;
  wherein the response comprises the data object when none of the links are stop condition links, and wherein the response comprises a list of stop condition links when one or more of the links are stop condition links;
wherein the pre-determined information associated with each of the first and second links is information critical to a respective state transition effected on the data object by the first resource server and the second resource server, respectively.

* * * * *